US012579347B2

(12) United States Patent
Reagan et al.

(10) Patent No.: US 12,579,347 B2
(45) Date of Patent: Mar. 17, 2026

(54) DYNAMIC ENFORCEMENT OF MANAGEMENT RULES ASSOCIATED WITH ARTIFICIAL INTELLIGENCE PIPELINE MODEL ROUTING

(71) Applicant: Airia LLC, Alpharetta, GA (US)

(72) Inventors: Spencer Reagan, Marietta, GA (US); Erich Stuntebeck, Alpharetta, GA (US); Andrew Morgan, Dublin (IE)

(73) Assignee: Airia LLC, Alpharetta, GA (US)

( * ) Notice: Subject to any disclaimer, the term of this patent is extended or adjusted under 35 U.S.C. 154(b) by 36 days.

(21) Appl. No.: 18/885,556

(22) Filed: Sep. 13, 2024

(65) Prior Publication Data

US 2025/0363200 A1 Nov. 27, 2025

Related U.S. Application Data

(60) Provisional application No. 63/658,434, filed on Jun. 10, 2024, provisional application No. 63/650,487, filed on May 22, 2024.

(51) Int. Cl.
| | |
|---|---|
| *G06F 21/00* | (2013.01) |
| *G06F 21/31* | (2013.01) |
| *G06F 21/36* | (2013.01) |
| *G06F 21/44* | (2013.01) |
| *G06F 21/50* | (2013.01) |

(52) U.S. Cl.
CPC ............ *G06F 21/44* (2013.01); *G06F 21/316* (2013.01); *G06F 21/36* (2013.01); *G06F 21/50* (2013.01)

(58) Field of Classification Search
None
See application file for complete search history.

(56) References Cited

U.S. PATENT DOCUMENTS

| | | | | |
|---|---|---|---|---|
| 2021/0248268 A1* | 8/2021 | Ardhanari | .............. | G06N 20/00 |
| 2021/0256160 A1 | 8/2021 | Hachey | | |
| 2021/0374602 A1 | 12/2021 | Zhang et al. | | |
| 2022/0156466 A1* | 5/2022 | Gill | ........................ | G06N 5/022 |
| 2023/0119654 A1 | 4/2023 | Wang et al. | | |
| 2024/0265147 A1* | 8/2024 | Kovach | ................... | G06F 21/64 |

FOREIGN PATENT DOCUMENTS

| | | | | | |
|---|---|---|---|---|---|
| CN | | 1836208 B | * | 9/2010 | ............. G06Q 50/10 |

* cited by examiner

*Primary Examiner* — Andrew J Steinle
(74) *Attorney, Agent, or Firm* — Clayton, McKay & Bailey, PC

(57) ABSTRACT

The invention provides a rules engine that applies customizable security rules and artificial intelligence (AI) model routing to queries. The rules are evaluated with respect to the query, an anticipate result of the query, and the actual result. Remedial actions are taken when the rule evaluation exceeds a threshold. The remedial actions include transforming the query by replacing sensitive information with a reversible placeholder. The actual result can be modified by reversing the placeholder and redacting additional sensitive information. The system can notify the user, an administrator, and a supervisor regarding the security evaluation and remedial actions. The evaluations can be logged for auditing purposes.

20 Claims, 12 Drawing Sheets

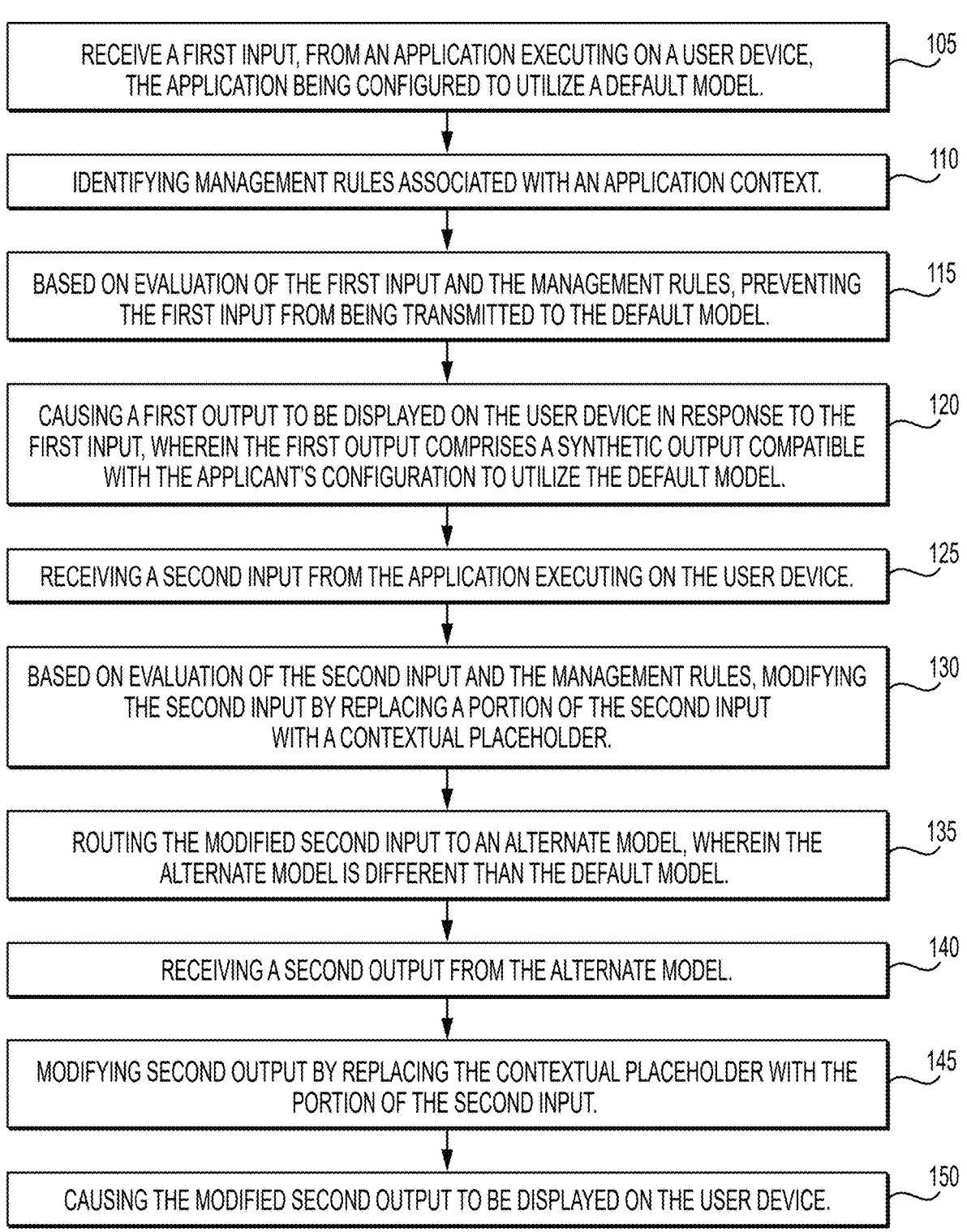

RECEIVE A FIRST INPUT, FROM AN APPLICATION EXECUTING ON A USER DEVICE, THE APPLICATION BEING CONFIGURED TO UTILIZE A DEFAULT MODEL. — 105

IDENTIFYING MANAGEMENT RULES ASSOCIATED WITH AN APPLICATION CONTEXT. — 110

BASED ON EVALUATION OF THE FIRST INPUT AND THE MANAGEMENT RULES, PREVENTING THE FIRST INPUT FROM BEING TRANSMITTED TO THE DEFAULT MODEL. — 115

CAUSING A FIRST OUTPUT TO BE DISPLAYED ON THE USER DEVICE IN RESPONSE TO THE FIRST INPUT, WHEREIN THE FIRST OUTPUT COMPRISES A SYNTHETIC OUTPUT COMPATIBLE WITH THE APPLICANT'S CONFIGURATION TO UTILIZE THE DEFAULT MODEL. — 120

RECEIVING A SECOND INPUT FROM THE APPLICATION EXECUTING ON THE USER DEVICE. — 125

BASED ON EVALUATION OF THE SECOND INPUT AND THE MANAGEMENT RULES, MODIFYING THE SECOND INPUT BY REPLACING A PORTION OF THE SECOND INPUT WITH A CONTEXTUAL PLACEHOLDER. — 130

ROUTING THE MODIFIED SECOND INPUT TO AN ALTERNATE MODEL, WHEREIN THE ALTERNATE MODEL IS DIFFERENT THAN THE DEFAULT MODEL. — 135

RECEIVING A SECOND OUTPUT FROM THE ALTERNATE MODEL. — 140

MODIFYING SECOND OUTPUT BY REPLACING THE CONTEXTUAL PLACEHOLDER WITH THE PORTION OF THE SECOND INPUT. — 145

CAUSING THE MODIFIED SECOND OUTPUT TO BE DISPLAYED ON THE USER DEVICE. — 150

*FIG. 1*

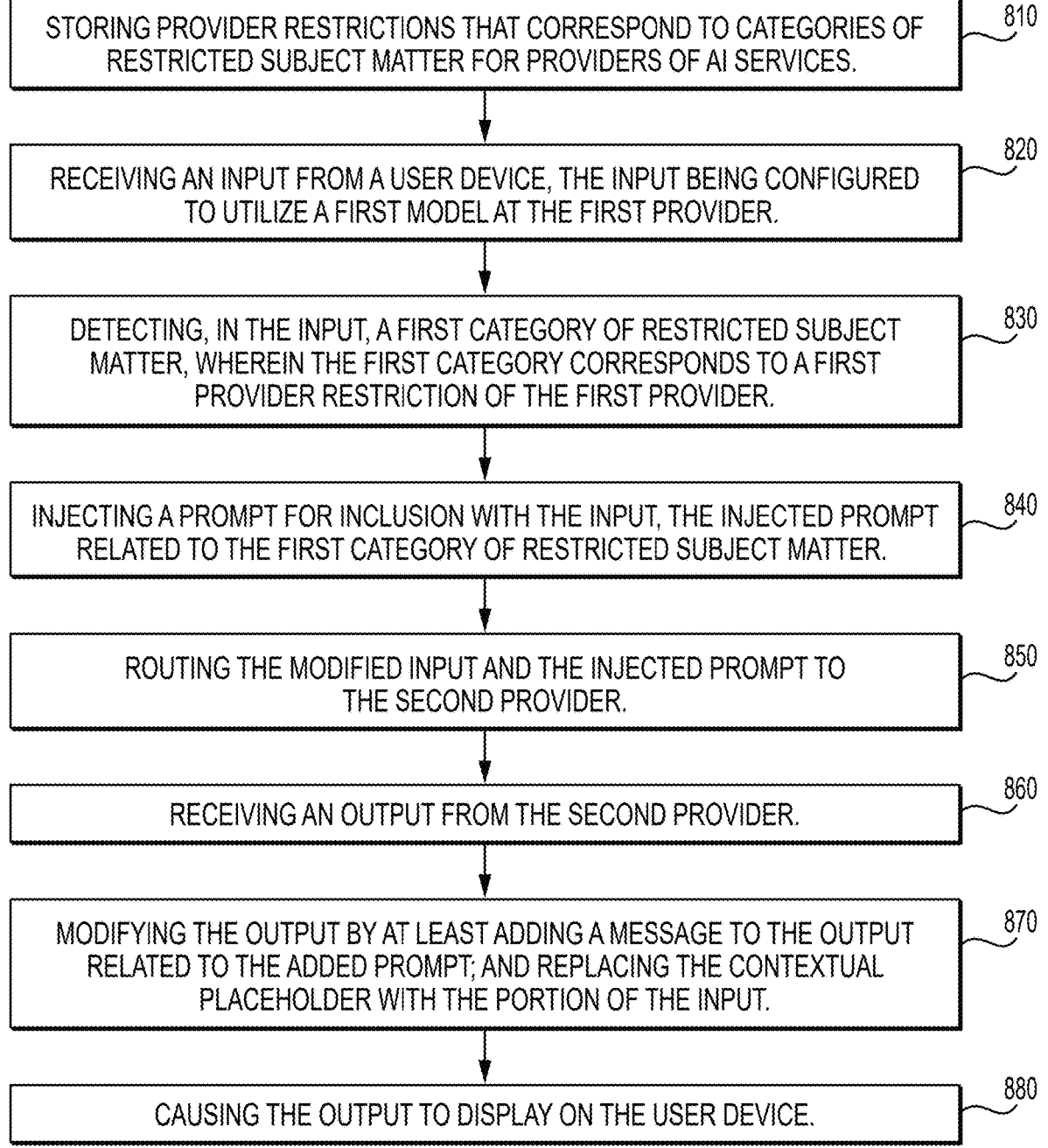

STORING PROVIDER RESTRICTIONS THAT CORRESPOND TO CATEGORIES OF RESTRICTED SUBJECT MATTER FOR PROVIDERS OF AI SERVICES. — 810

RECEIVING AN INPUT FROM A USER DEVICE, THE INPUT BEING CONFIGURED TO UTILIZE A FIRST MODEL AT THE FIRST PROVIDER. — 820

DETECTING, IN THE INPUT, A FIRST CATEGORY OF RESTRICTED SUBJECT MATTER, WHEREIN THE FIRST CATEGORY CORRESPONDS TO A FIRST PROVIDER RESTRICTION OF THE FIRST PROVIDER. — 830

INJECTING A PROMPT FOR INCLUSION WITH THE INPUT, THE INJECTED PROMPT RELATED TO THE FIRST CATEGORY OF RESTRICTED SUBJECT MATTER. — 840

ROUTING THE MODIFIED INPUT AND THE INJECTED PROMPT TO THE SECOND PROVIDER. — 850

RECEIVING AN OUTPUT FROM THE SECOND PROVIDER. — 860

MODIFYING THE OUTPUT BY AT LEAST ADDING A MESSAGE TO THE OUTPUT RELATED TO THE ADDED PROMPT; AND REPLACING THE CONTEXTUAL PLACEHOLDER WITH THE PORTION OF THE INPUT. — 870

CAUSING THE OUTPUT TO DISPLAY ON THE USER DEVICE. — 880

*FIG. 8*

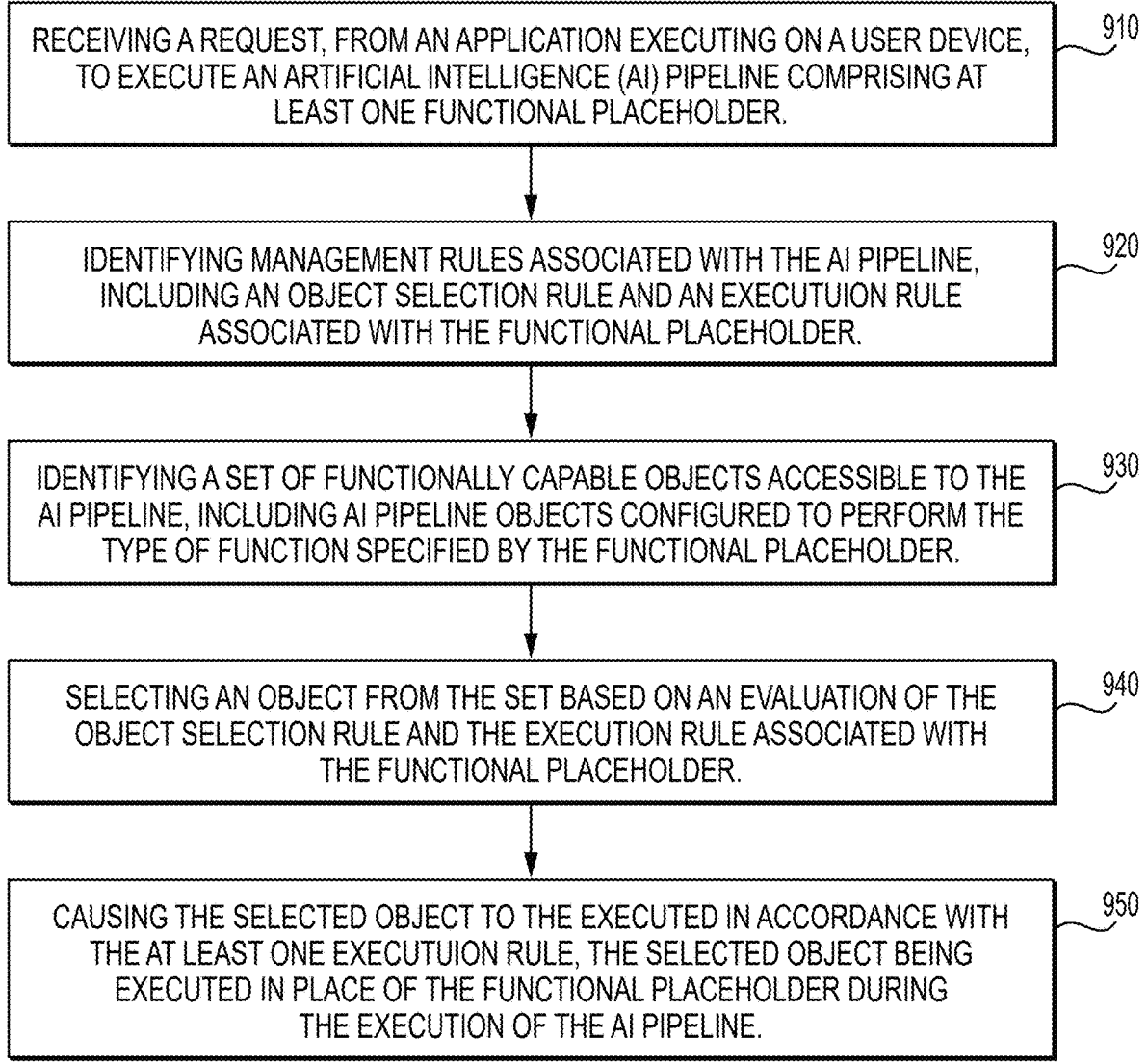

RECEIVING A REQUEST, FROM AN APPLICATION EXECUTING ON A USER DEVICE, TO EXECUTE AN ARTIFICIAL INTELLIGENCE (AI) PIPELINE COMPRISING AT LEAST ONE FUNCTIONAL PLACEHOLDER. — 910

IDENTIFYING MANAGEMENT RULES ASSOCIATED WITH THE AI PIPELINE, INCLUDING AN OBJECT SELECTION RULE AND AN EXECUTUION RULE ASSOCIATED WITH THE FUNCTIONAL PLACEHOLDER. — 920

IDENTIFYING A SET OF FUNCTIONALLY CAPABLE OBJECTS ACCESSIBLE TO THE AI PIPELINE, INCLUDING AI PIPELINE OBJECTS CONFIGURED TO PERFORM THE TYPE OF FUNCTION SPECIFIED BY THE FUNCTIONAL PLACEHOLDER. — 930

SELECTING AN OBJECT FROM THE SET BASED ON AN EVALUATION OF THE OBJECT SELECTION RULE AND THE EXECUTION RULE ASSOCIATED WITH THE FUNCTIONAL PLACEHOLDER. — 940

CAUSING THE SELECTED OBJECT TO THE EXECUTED IN ACCORDANCE WITH THE AT LEAST ONE EXECUTUION RULE, THE SELECTED OBJECT BEING EXECUTED IN PLACE OF THE FUNCTIONAL PLACEHOLDER DURING THE EXECUTION OF THE AI PIPELINE. — 950

*FIG. 9*

DYNAMIC ENFORCEMENT OF MANAGEMENT RULES ASSOCIATED WITH ARTIFICIAL INTELLIGENCE PIPELINE MODEL ROUTING

CROSS-REFERENCES TO RELATED APPLICATIONS

This application claims priority as a non-provisional application to U.S. provisional application No. 63/658,434, titled "Artificial Intelligence Pipeline Platform," filed on Jun. 10, 2024, the contents of which are incorporated herein in their entirety. This application also claims priority as a non-provisional application to U.S. provisional application No. 65/546,801, filed May 15, 2024, and to U.S. provisional application No. 63/650,487, filed May 22, 2024, both of which are incorporated herein in their entirety.

BACKGROUND

Customers are concerned about the use of sensitive data with large language models (LLMs). This can include both sending sensitive data in prompts, as well as LLMs being induced via prompt injection into returning sensitive enterprise or personal data that the requesting user or process should access. Sensitive data can include personally identifiable information (PII), payment card industry (PCI) data security standard (DSS) data, Health Insurance Portability and Accountability Act (HIPAA) data, Enterprise documents and data, and others. Although there are many tasks that an LLM or other artificial intelligence (AI) model can assist with, enterprises are hesitant to use the models based on the possibility of sensitive data being used in queries or revealed in the responses to queries.

Additionally, large enterprises must deal with cost creep and inefficiencies related to employee and customer queries being handled by inappropriate models. Different AI models are trained for different tasks, require different amounts of resources, and have different latencies and processing limitations. Many applications are stuck using a single model without the ability to add any sort of intelligent model routing.

Additionally, there are many offerings for various other pipeline objects, such as scripts, code, tools, datasets, prompts, and the like. It is difficult for a user to know if they have the best pipeline object for a given function type.

Currently, no technology exists that addresses both the sensitive data and model routing issues associated with enterprise use of AI services. This has led to enterprises being slower to adopt new AI technologies due to data security and cost issues. As a result, there is a need for a solution that can intelligently route user queries to the appropriate AI account.

SUMMARY

Examples described herein include systems and methods for a rule engine that performs a unique combination of data loss prevention (DLP) and AI model routing for enterprise inputs. Management rules for DLP and other types of forbidden content can be defined by enterprise customers, called tenants, in a granular fashion that allows the tenant to utilize third-party AI services without revealing sensitive or harmful personal or enterprise information to the third-party AI service. The management rules can also dictate or influence model routing, such as choosing the most economical or accurate model for a given input. This dynamic rule enforcement can give companies the needed security assurances to more fully adopt AI services.

Additionally, a gateway can be provided that allows for easy implementation of the rule engine with an existing enterprise application. The application can simply use an endpoint associated with the gateway, and the rule engine can then provide the rule enforcement on the application's input and an AI service's output. The tenant can customize which rules are applied, giving enterprises control over how the gateway operates with respect to different AI pipelines, pipeline objects, and organizational groups. Rule definitions can be defined using a user interface (UI) associated with the rule engine server. Violations and associated remedial actions can be logged by the system, such as in sub-logs of entire transaction logs.

The rule engine can receive a first input from an application executing on a user device. The application can be configured to utilize a default model, such as a particular LLM. However, by sending the input to the gateway or directly to the rules engine, the rules engine is able to apply management rules before sending the input to the default model. As will be discussed, the input can be altered, blocked completely, or routed to a different model, depending on the management rules applied.

The gateway or rules engine can identify management rules associated with an application context of the user device. The application context can be information that identifies the application, the user device, the user, or a tenant that the user belongs to. This information can be used to identify a subset of management rules that applies to the input. For example, a tenant can set their own management rules that apply to tenant customers or users. When the application context can be linked back to the tenant, user, or group, and from there the preset management rules can be retrieved.

In one example, the rules engine identifies the management rules based on a tenant associated with the application context. At least some of the management rules include weights that are applied through a user interface (UI) by an administrative user. For example, an activated management rule can be shown next to a slider. The slider can allow the user to adjust the relative weight of the activated management rule. The weights are used to calculate remediation scores for evaluating the inputs. The remediation scores can then be compared against multiple thresholds. As a highest threshold, the input will be blocked. However, other thresholds can allow for different sets of remedial actions of gradual severity.

Based on evaluation of the first input and the management rules, the rules engine can take various actions. The evaluation itself can be based on a trained model that reviews the input, user bias, and the rules, and outputs a score, such as between 0 and 1. Different moveable thresholds can then dictate the action that the rules engine takes. One such action is to prevent the first input from being transmitted to the default model. This can occur if the input includes a high prevalence violation of a highly weighted rule. For example, if the input includes a query for other user's social security and credit card numbers, this likely would violate at least one highly weighted management rule.

The rules engine can synthesize a notification to the application regarding the blockage. This can cause a first output to be displayed on the user device in response to the first input. The first output can be a synthetic output compatible with the application's configuration to utilize the default model. This means the first output can include a format that would be expected from the default model, such that the application does not crash. The synthetic output can include an indication that the evaluation of the first input and the management rules prevented transmission of the first input to the default model. For example, the synthetic output can include a message that states that an alternate model was used based on submission of a social security number.

In one example, the synthetic message can include a prompt or other option for the user to override the blockage. Based on user selection, the application can send an instruction to override the prevention of transmission of the first input to the default model. After receiving that, the rules engine can determine that the override instruction is permitted based on the evaluation of the first input and the management rules. When the override is permitted, the rules engine can transmit the first input to the default model.

The rules engine can receive other inputs from the application, including a second input. The second input can be part of a back-and-forth interaction or an entirely unrelated different input. Based on evaluation of the second input and the management rules, the rules engine can modify the second input by replacing a portion of the second input with a contextual placeholder. The remedial action taken on the second input can be based on the remediation score being lower than the threshold required for blocking, but above a threshold for sending the second input to the default model without remediation. For example, the input can include both a name and social security number, which may not necessitate blocking but instead can be handled with less severe remediation. In that example, the name can be replaced with "Person 1" and the social security number can be replaced with "SSN 1." The remediation score and threshold comparison can allow the rules engine to determine a first remedial action to take with respect to modifying the second input. The model trained to generate the remediation score can take into account both the input and the likely output, meaning that even if the input includes no dangerous keywords, dangerous outputs can be prevented.

The rules engine can also route the modified second input to an alternate model, different than the default model. For example, a local language model can be used for highly sensitive or personal inputs, rather than a default public model. The routing can be based on the management rules, such as including a smaller subset of viable AI models that can receive inputs with high sensitivity (e.g., remediation scores above a threshold). In one example, the routing of the modified input includes translating the modified input to meet an application programming interface (API) format for the alternate model. The API format for the alternate model can differ from the API format of the default model. Therefore, various parameters can be translated between the models, and the correct API calls can be made.

The rules engine can then receive a second output from the alternate model. The rules engine can reverse its prior transformations by modifying the second output. To do this, the rules engine can replace the contextual placeholder with the portion of the second input. This allows the second output to the application to no longer include the placeholders and make more sense semantically based on what the input was. By transmitting the modified output, the rules engine can cause the modified second output to be displayed on the user device.

The rules engine can log the transactions for auditing purposes. This can include sending portions of the inputs, modifications, rules, and outputs, to a logging service for logging. The rules engine can log the first input and information associated with the evaluation of the first input and the management rules.

The AI gateway can be contacted by tenant applications that submit queries and other inputs to an AI model. Instead of contacting the model provider directly, the application can access an endpoint at the gateway and provide an API key. The gateway can receive queries and route them to a rules engine. The rules engine can preprocess the queries by comparing against DLP rules and routing rules prior to sending them to a request model, which can be the model where the tenant application originally was sending the query. The gateway can identify DLP rules associated with a user of the user device. This can include deducing the user's identity based on information known about the device. The user can be associated with a tenant or group. And from there, the system can retrieve DLP rules associated with the tenant or group.

Based on the DLP rules, the rules engine can block the first query from reaching the request model. The rules engine can also notify the gateway, such that a response of some kind can be sent to the user rather than causing the application to crash or otherwise malfunction. The notification can be sent in a response format of the request model to avoid causing the tenant application to crash.

In one example, the gateway can be reached by including an endpoint URL and a key in the application. In another example, the application can make use of an application programming interface (API) to send and receive information to and from the gateway. A tenant application can incorporate an agent or software development kit (SDK) that makes API calls to a gateway server. The gateway server can perform pre and post filtration of data around the AI service, such that sensitive data is kept from being input into and output from the AI service. Pre and post filter calls can be made by proxy. The filter calls can include a prompt along with a list of filters or categories to apply, along with other actions to take (e.g. logging configuration). Actions can be reported back to the client application using the API. For example, an API response to block the query can be sent back to the client.

A proxy is one advantageous point for pre/post filter integration with the gateway. This is because the proxy can have visibility into all traffic to and from an AI model, such as a large language model (LLM). The proxy can make calls to the gateway server, or the gateway server itself can act as the proxy. The gateway server executes a DLP service and can also route the query to an appropriate model based on various performance and cost requirements of a tenant. The gateway server acts as an AI firewall for performing AI-related enterprise tasks.

At stage 810, a rules engine or other service can store provider restrictions that correspond to categories of restricted subject matter for providers of AI services. For example, many AI services have terms of service that preclude certain uses of the AI service. These precluded uses can be contextual, such as seeking medical or legal advice. The precluded contexts can extend beyond vocational advice. For example, high risk activities such as automated driving can be prevented from using the model. A service provider might also disallow religious, political, or sexual interactions with the model. The service providers can be numerous, and the rules engine can maintain a datastore with restricted categories pertaining to the various providers. The restricted subject matter categories can be identifier for particular providers, such as a first provider and a second provider, but supplying a provider identifier. The rules engine can use the stored provider restrictions to route an input, such as by determining which providers to use or avoid for a given input. The provider restrictions can be periodically updated by requesting the restrictions or scraping information from provider terms of service.

The gateway or AI platform can receive an input from an application executing on a user device. The endpoint URL and/or key can indicate a configuration where the application by default will utilize a first model at the first provider. For example, this can be the default model and provider for an AI pipeline that is handling the input. The AI pipeline can be executed by a pipeline engine that contacts the rules engine, providing the input.

The rules engine can detect which provider restrictions are implicated by the input. This can include detecting a first category of restricted subject matter. The first category can then be mapped to a first provider restriction of the first provider. For example, a repository of categories of restricted subject matter (e.g., categories of provider restrictions) can be mapped to identifiers for each provider that includes that provider restriction. Therefore, when a category of restricted subject matter is detected in the input, this can be matched against which providers forbid those same categories.

In addition to detecting provider restrictions, the input can still be evaluated based on the other management rules. Based on a management rule applying, the rules engine can modify the input with a reversible transformation. This can include replacing a portion of the input with a contextual placeholder. For example, a credit card number can be replaced with "credit card 1." This can prevent leakage of sensitive information while still giving enough context for a model to make sense of an input.

The management rules are identified based on application context, which can relate the input to a tenant. At least some of the management rules can include weights that are applied through a user interface (UI) by an administrative user, and that are tenant-specific. The weights can be used to calculate remediation scores for evaluating the input. If the remediation score for the input is above a first threshold for allowing the input and below a second threshold for blocking the input, the reversible transform can be performed.

Detecting a provider restriction can cause the rules engine to inject a prompt for inclusion with the input. The injected prompt can relate to the first category of restricted subject matter. For example, the injected prompt can be a needed disclaimer to satisfy system rules of the provider that may other block access to the model based on the input including the restricted subject matter. Again, the restricted subject matter can be contextual, such as seeking medical advice, so the injected prompt can disclaim that context.

A detection of a highly sensitive provider restriction can prevent transmission of the input to the first provider. The rules engine can cause the user device to receive an indication that the first provider does not allow the first category of restricted subject matter. The use can then submit an instruction to override the prevention of transmission of the second input to the first provide. The rules can receive the instruction and determine that the override instruction is permitted based on the evaluation of the input and the management rules. As a result, the input and the injected prompt can be submitted to the first provider. Alternatively, the indication at the user device can identify the second provider as the destination for the second input, and the user can accept that prior to transmission.

The rules engine can route the modified input based on both the management rule evaluation and the detected provider restrictions. This can include routing the modified input to a service provider that satisfies the remedial actions and also where the input is not forbidden. For example, the rules engine can route the modifier input to a second provider.

The rules engine can receive an output from the second provider in response to the modified input and the injected prompt. At stage 870, that output can be modified based in part on the modifications to the input. For example, the rules engine can add a message to the output related to the injected prompt, such as a disclaimer to not use the information as medical advice. The rules engine can also replace a contextual placeholder with the original portion of text from the input.

The rules engine can cause the output to display on the user device. This can include sending the modified output back to the gateway or AI platform that called the rules engine. The rules engine can also log any aspect of the method for auditing, such as logging the input, the first category of restricted subject matter, the routing, and the reversible transformation.

The sensitivities of the provider restrictions can be adjustable by an administrative user on a user interface (UI) of the AI platform. Detecting a category of restricted subject matter that corresponds to a provider restriction can include comparing a score for the first category against a threshold. The threshold can be adjustable on the UI is well, such as with a selection of a preset stringency for the first category.

The rules engine can also perform routing with respect to selecting a pipeline object to use in place of a functional placeholder defined in an AI pipeline. The rules engine or pipeline engine can receive a request to execute an AI. The request can originate from an application executing on a user device. The AI pipeline can be constructed to include at least one functional placeholder. The functional placeholder comprises a specification of a type of function that the AI pipeline should execute at runtime. Unlike a typical pipeline object, the functional placeholder need not itself identify the exact code or service provider involved in executing the function, but instead includes rules (object selection and execution rules) that the pipeline engine or rules engine can use to select a pipeline object. Instead, the functional placeholder identifies a function type, such as PII redaction. Although the rules engine is described as performing these stages, the pipeline engine could alternatively perform some of the stages.

The rules engine identifies management rules associated with the AI pipeline. The management rules include an object selection rule and an execution rule associated with the functional placeholder. In one example, the management rules can be identified by the functional placeholder.

The rules engine can also identify a set of functionally capable objects accessible to the AI pipeline. These can be pipeline objects having the function type specified by the placeholder object. The set of these pipeline objects are then evaluated by the rules engine to determine which of the pipeline objects should be used. The rules engine selects an object from the set based on an evaluation of the object selection rule and the execution rule associated with the functional placeholder. For example, an object selection rule can be a selection cost rule, which includes rules around monetary cost and/or execution performance impact. An execution performance impact rule can compute performance cost rule, a memory performance cost rule, and/or a network performance cost rule. The selection cost rule can include infrastructure impact rules.

The object selection rules can also include a risk rule or a compliance rule. The selection risk rule can include a trade compliance risk rule, a cyber security risk rule, and a sensitive data risk rule. These risk rules can be used to ensure that a selected pipeline object accounts for the risk prevention a tenant has in mind for the AI pipeline. The object placeholder can also include one or more object compliance rules. The object compliance rules can be used to ensure the selected pipeline object meets terms of service for the AI platform or other pipeline objects in the AI pipeline. The object compliance rules can also be set to ensure rules of the AI pipeline, such as DLP rules, are enforced by whichever pipeline object is selected to fill the object placeholder. These object selection and compliance rules can include maximum or minimum thresholds and can be compared to technical information of the pipeline objects in the set. A pipeline object that best meets the various object selection and execution rules can be selected by the rules engine.

In one example, the UI can allow an administrator to supply weights on the object selection and execution rules. Therefore, similarly to generating a remediation score, the rules engine can generate a selection score for each the pipeline objects in the set. The pipeline object with the best (e.g., highest) selection score can be selected to operate in place of the functional placeholder.

The rules engine can cause the selected object to be executed in accordance with the at least one execution rule. The selected object is executed in place of the functional placeholder during the execution of the AI pipeline. The execution rules can guide how and when the selected object executes. One example execution rule is an execution scheduling rule. This rule can cause the selected object to execute at a particular day and time. The execution scheduling rule can alternatively prohibit a period or day. This is because resource availability and cost can shift throughout the course of the day, meaning the execution timing can be associated with different costs. Additionally, for an AI pipeline that must execute quickly, the execution rule can help ensure that the selected object does not cause unacceptable delay. Another type of execution rule is a deployment rule, which can specify where a selected object can or cannot be executed. The execution deployment rule can include an indication of at least one geographic location where execution of the functional placeholder is permitted.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 1 is a flowchart of an example method for dynamic management rule enforcement and AI model routing.

FIG. 8 is a flowchart of example stages for dynamic enforcement of provider restrictions as part of AI model routing.

FIG. 9 is a flowchart of example stages for dynamic pipeline object selection based on functional placeholders.

DESCRIPTION OF THE EXAMPLES

Figure 2:
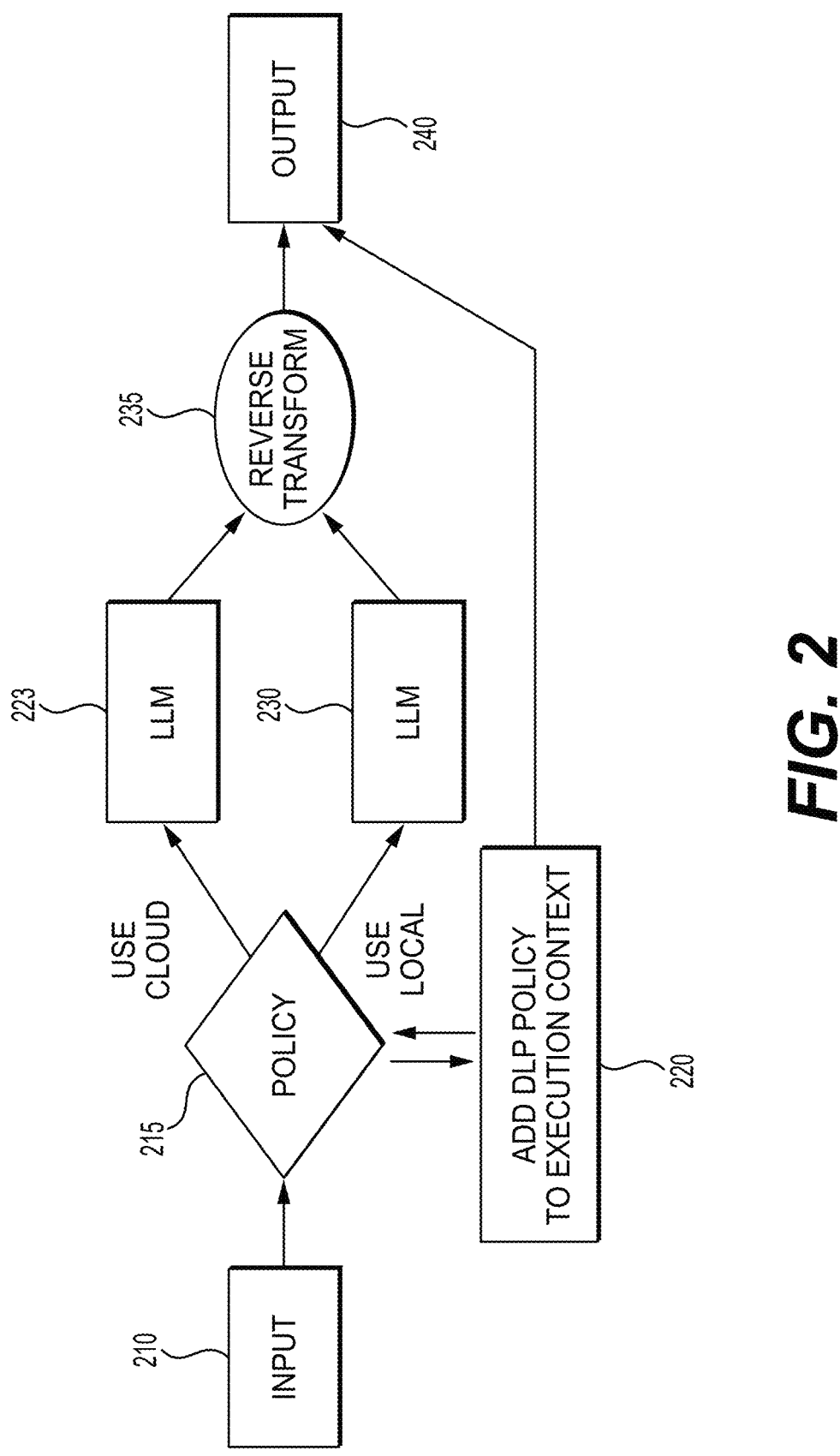
FIG. 2 is a flowchart of an example method for dynamic management rule enforcement and AI model routing.

Reference will now be made in detail to the present examples, including examples illustrated in the accompanying drawings. Wherever possible, the same reference numbers will be used throughout the drawings to refer to the same or like parts.

A rules engine can execute on one or more servers and be utilized by an application that executes on a user device. The application can include an AI pipeline or can cause execution of an AI pipeline at a different location, such as on an AI platform. The AI pipeline can include an endpoint, such as a URL, and a key for accessing the rules engine. The rules engine can receive an input from the application to determine whether that input should be sent to a default model. Using application context, the rules engine can identify some combination of the user, their device, the tenant they belong to, and a group to which the user is assigned. This information can be used to look up management rules that are active and that apply to that user.

The management rules can then be evaluated in conjunction with the input, such as by an AI model. Based on a remediation score of that evaluation, the rules engine can take various remedial measures. These include blocking the input from reaching the default model, modifying the input prior to sending the modified input to the default model, or sending the input or modified input to an alternative model. A synthetic output that includes a format of the default model can be supplied to the application, notifying the user of the blockage. In some cases an override is available. The output of the model can likewise be evaluated by the rules engine with modifications being made prior to sending to the application. The evaluation, remedial actions, and override attempts can be logged for future auditing.

FIG. 1 is a flowchart of an example method for dynamic DLP enforcement and AI model routing. The stages can be performed by a rules engine or at the behest of the rules engine. The rules engine can execute as one or more processes on one or more hardware servers. The rules engine can add management rule enforcement to existing AI pipelines and can modify and even reroute inputs to alternate AI models. At stage 105, the rule engine receives a first input from an application executing on a user device. The application can include or access an AI pipeline with at least one AI model, called the default model, as a destination for the input. The first input can be sent to the rules engine based on an endpoint and key. The endpoint can be a URL, and the key can be used as an access credential.

At stage 110, the rules engine can identify management rules associated with an application context. The application context can include information about the user, user device, and/or tenant to which the user belongs. Stored profiles can link the user to different tenants and groups. Additionally, the user profile, group, or tenant can be associated sets of management rules that apply to that user. Different types of management rules can exist. For example, the management rules can be moderation oriented, PII oriented, and related to security of enterprise content.

In one example, the rules engine operates as a proxy server. When the proxy server receives a message, it can retrieve the management rules that apply to that specific user. This can include calling a DLP service and waiting for a response. The following information can be supplied: Request ID (GUID), message content, destination and source model, name, size (e.g., parameters), provider (e.g., public endpoint, AI platform managed, customer managed), filters to apply, remediation action, redact, encrypt, and log only.

In its response, the DLP service can provide to proxy server: request ID, filtered message, PII redaction, secrets redaction (passwords, keys, etc.), and sensitive enterprise content flagging. The DLP service can also include an ability to configure actions for prompts that match sensitive data classifiers. For example, a configurable flow can either: block and respond with a configurable message, allow the prompt after sensitive content redaction, and allow the prompt unmodified.

The management rules and associated actions can be selected, modified, and stored with respect to various tenants and groups within those tenants. In one example, a UI is provided that an administrative user can access. The UI can include a list of potential management rules, with buttons to activate them and UI elements for weighting the strictness of the rules. The UI can also include a routing policies list view that allows assignment of routing rules by user, group, tenant, application, or project.

In one example, a security policy object can be applied to pipelines as a tenant-wide policy or as an object in the pipeline. This can allow a tenant administrator to configure security policies applicable to tenant pipelines. The tenant administrator can likewise exclude specific projects or pipelines from operation with the gateway. Exclusion can be performed by selecting pipelines and projects in a searchable combined drop down. A project owner can configure security policies in pipelines (via a security policy object). The AI platform can combine all security policies applied to a pipeline by aggregating a rule set and defaulting to the most restrictive action to handling conflicts.

At stage 115, the rules engine can make or receive an evaluation of the first input and the management rules. Based on that evaluation, the rules engine can prevent (e.g., block) the first input from being transmitted to the default model.

The evaluation can include supplying the first input and management rules as inputs to a trained model that outputs a remediation score. The model can consider the input, the management rules that apply, and contextual information in generating the score. For example, the input may have different occurrence and prevalence of content that meets the management rules. The occurrence can map to a configurable severity, which is represented in the weights for each rule as assigned by an administrator. The prevalence of rule violations can act as a multiplier on the severity.

Additionally, contextual information can increase or decrease the remediation score. For example, the model can develop a user bias. If the same user is repeatedly violating management rules, then the model can become more strict in its application of the management rules to inputs from that user. Likewise, management rules regarding device type, device location, and device compliance can increase or decrease the strictness with which the management rules get applied. This contextual information can be considered by the model or can separately be used by the rules engine to adjust the remediation score or thresholds. In this way, the remediation (e.g., DLP) and model routing actions can depend on both the tenant and the specific user making the request. User attributes are detected and used for determining remedial actions and model routing. These user attributes include name, email, phone number, and any other identifying information.

The remediation score output by the model can be compared against multiple thresholds to determine which actions to take or not take. For example, the remediation score can fall within a range, such as zero to one. A first low threshold, such as at 0.3, can be used to allow the input without modification, in which case the input can be sent to the default model. A second high threshold, such as at 0.6, can be used to block the input from reaching the default model. In one example, another high threshold, such as 0.75, can be used to block the input but notify the user of the detected rule violation and verify whether the user would like to submit the input anyway. In the example, of FIG. 1, the threshold comparison causes the rules engine to prevent the transmission of the first input to the default model.

Other remedial actions are also possible. For this, one or more medium thresholds can exist, such as between 0.3 and 0.6 (e.g., at 0.35, 0.4, 0.5, and 0.55), yielding a tiered remediation system. Different remedial actions can be associated with those thresholds. Example remedial actions include routing the input to an on-premises or isolated model, redacting and/or replacing portions of the input, warning the user but allowing the input upon user confirmation, and other remedial actions up to outright blocking.

The system can use detectors, a set of attributes or recognizers, to detect rule-implicating elements in a query. A detector library can be included for detecting different DLP elements, based on administrative setup. Detectors can be conditional and customized. An example of one such detector is if: "detect prompt injection">"80%," where each aspect of the if statement is selectable by the administrative user. A marketplace of detectors can also be provided in a user interface (UI) associated with the gateway server. This can allow tenants to easily customize their DLP service according to their specific needs.

The gateway can execute a pipeline through which all AI-service-bound traffic is routed. The pipeline can include a conditional collection of if-this-then-that (IFTT) rules that are turned on or off by individual tenants. A detection service can use the IFTT rules to detect a rule violation. The detection service can report a rule violation to an AI platform, which then takes remediation actions. The gateway can support full conversations, such as an array of messages, as well as streaming and image uses.

In another example, an AI platform is accessed by the user device to execute an AI workflow. The application itself can execution totally or partially on the AI platform.

At stage 120, although the first input was not transmitted to the default model, the rules engine can cause a first output to be displayed on the user device in response to the first input. However, the first output is a synthetic output. It does not come from the default model as expected. Instead, the synthetic output is compatible with the application's configuration to utilize the default model. Rather than just raising an exception, the rules engine can send an output that does not cause the application to crash. A same response format as from the default model can be used.

At stage 125, the rules engine can receive a second input from the application. The second input can be part of a back-and-forth interaction that includes the first input or the second input can be unrelated to the first input. In one example, the second input includes a query.

At stage 130, the rules engine causes evaluation of the second query relative to the management rules. Again, this can include using a model that is trained to recognize potential rule violations. The model can look for rule violations in the first input, such as in the query as written, and also can be trained on outputs, allowing for recognition of violations in the likely output relative to the query.

As explained for stage 115, the rules engine can make threshold comparisons based on the remediation score output from the model. In this example, the remediation score falls into the medium threshold range, resulting in a remediation action to modify the second input by replacing a portion of the second input with a contextual placeholder. The replaced portion can be, for example, personally identifiable information (PII), such a name, a phone number, a credit card number, an address, a social security number, a driver's license number, passport number, taxpayer identification number, patient identification number, or financial account number, among others. Multiple instances of PII can be replaced in a single query. The placeholder can be contextual. For example, the name can be replaced by "Person 1," the credit card number can be "Credit Card 1," a passport number can be "Passport 1," and so on. The contextual placeholder can still provide context to the AI model regarding the portion of text it replaced, allowing for more accurate answers and minimizing the chances of the query being misunderstood.

At stage 135, the rules engine can also re-route the second input based on the remediation score and the particular management rules. Instead of sending the second input to the default model, the second input can be sent to an alternative model that is different that the default model. The alternative model can still be the same model type, such as a language model. In one example, the alternative model is more secure, such as an on-premises or isolated LLM. In another example, the alternative model is more effective at processing the particular input. In still another example, the alternative model is cheaper to use.

In one example, the routing of the modified input includes translating the modified input to meet an application programming interface (API) format for the alternate model. The API format for the alternate model can differ from the API format of the default model. Therefore, various parameters can be translated between the models, and the correct API calls can be made. A wrapper can be used that represents the AI operation, but that easily translates to API calls between the different models. For example, the wrapper can include values for the query, temperature (i.e., creativity), syntax, and an API key.

The rules for model routing rules can be customized by an administrative user. An example rule is if latency is greater than 10 seconds, choose a different model. Another example is if a failure is detected in a model, choose a different model from the same provider. Still another example that combines both DLP and model routing, is if PII is detected, route the query to an internal model.

The rules engine can perform model routing based on latency of response time, which can include inference latency and network latency. For example, if the gateway receives the source internet protocol (IP) address, the rules engine can use that to route to a geographically advantageous model endpoint. The dataset location and type can likewise influence the routing. For example, a legal dataset can route to a LlaMA model. The gateway can also consider the complexity of the request and model health (e.g., availability). For example, the gateway can gauge language model response times by using a health check API, and determine whether the response time is acceptable for the particular client application and query based on tenant configuration.

In one example, when output is blocked, the gateway or AI platform can return a response that appears to come from the language model. This prevents the client application or end user from experiencing an error. If the time to respond exceeds a threshold, the gateway can return an interim response or a replacement response in case of a policy violation. The interim response can be pre-defined or generated by a different model, depending on administrative settings.

An orchestration service can be used to reduce latency of the language model. Certain tasks can be run in parallel, minimizing idle time and speeding up the overall process. For example, orchestration services can break down the components of the language model's operations (such as preprocessing, model inference, and post-processing) and run them in parallel where possible. For instance, multiple language model requests can be handled simultaneously across different nodes or containers. Additionally, orchestration can provide load balancing to distribute requests across multiple nodes. Orchestration can also perform horizontal and vertical scaling when additional instances of a model are needed. Caching can also be used to provide outputs that recently have been received from the destination model for the same or semantically similar inputs.

The rules engine can direct tasks to the most suitable model based on the nature of the task, optimizing both efficiency and accuracy. The rules engine can provide varying degrees of complexity and adaptability in routing tasks to models within LLM-based systems. Choosing the right method can depend on factors such as system dynamics, task variability, and the importance of real-time adaptation versus static rule adherence.

For proxied requests, the gateway or AI platform can select one out of every n queries to route to multiple models. The various responses can be scored based on timing, accuracy, and cost. The scores can be used to update model routing.

The customer can configure the gateway or rules engine to do only one of DLP and model routing, or both. In one example, a tenant administrator can configure corporate prompt routing rules (proxy settings) and DLP policies that apply to all projects, agents, and pipelines. In another example, an administrator can configure a DLP policy as a part of a pipeline.

For example, if only the data policy is activated, the gateway can be used to detect PII and edit or block prompts that contain it. If payment card industry (PCI) data is detected, the gateway can redact and allow the prompt.

If both the data policy and intelligent routing is activated, then PII detection can result in the gateway routing the request to an internally hosted AI model. In another example, if the request originated in the European Union (EU), the gateway can redact PII and route the request to EU hosted models.

Routing can be static or dynamic. Static routing involves predefined rules or conditions that dictate how tasks are routed to specific models. Static routing is simple to implement and understand. It also provides deterministic routing decisions based on fixed criteria. However, static routing can be rigid and less adaptable to changing conditions or new data patterns. Static routing may not optimize routing based on real-time performance metrics. Static routing can be suitable for environments with stable task characteristics and clear, static criteria for model selection.

Dynamic routing employs machine learning or AI algorithms to make real-time decisions on task routing based on current conditions and model performance metrics. Advantageously, dynamic routing adapts to changing task distributions and model performance variations. Dynamic routing can optimize routing decisions based on up-to-date data and insights. Dynamic routing can require computational resources for real-time decision-making. Additionally, initial setup and tuning of AI algorithms are needed. Dynamic routing can be ideal for dynamic environments where tasks vary over time and where optimal model selection is critical for performance.

Benchmark-based routing involves training a routing mechanism using historical performance data of models to predict and select the most suitable model for incoming tasks. Benchmark-based routing utilizes past performance metrics to guide routing decisions, optimizing for models that historically perform well on similar tasks. Benchmark-based routing can sometime require ongoing monitoring and updating of benchmarks as models and task distributions evolve. Benchmark-based routing is often dependent on historical data accuracy. Benchmark-based routing can be effective in environments where task characteristics are consistent over time and where historical performance data is reliable and informative.

Factors that the rules engine can consider when choosing a model for input routing purposes include: cost, latency, execution environment, on-premises and privately hosted, shared, trusted models, response quality, model domain expertise, request size versus model context window size, predicted model verbosity (e.g., send requests to more concise models), load balancing across servers, available providers, and available API keys.

In one example, if an administrator wants to route between a specific set of models, the administrator can include those models as a list in the models field. The rules engine can restrict its routing to the models specified in that field.

Various parameters can be provided for the administrator to change how the model routing occurs. For example, if the administrator does not care only about performance, but does care about other factors such as cost, the administrator can set values for things like the max_cost or willingness_to_pay (i.e., how many dollars will the tenant pay for a 10% better answer on this request?). These parameters can allow an administrator to tightly control unit economics. For example, a free product might use the max_cost parameter to calculate customer acquisition cost (CAC). Or, to ensure a correct answer in the product, the administrator can set the willingness_to_pay parameter and get answers that balance cost and performance.

At stage 140, the rules engine receives a second output from the alternate model. The output can be responsive to a modified first input, such as a query with contextual placeholders in it.

At stage 145, the rules engine can modify the second output. This can include replacing the contextual placeholders with the portions that originally existed in the second input. For example, "Person 1" can be replaced with that person's name.

Other modifications can also be made based on checking the output for management rule violations. This can include sending the output to the model to calculate a remediation score. The thresholds and remedial actions can be different for the output than for the input.

At stage 150, the rules engine can cause the modified second output to be displayed on the user device. This can include transmitting the modified second output to the process that invoked the rules engine, which could be the application or could be a proxy or gateway that the application called.

The rules engine can also cause logging of the rule evaluations, modifications, and the input and output. The log can include date, time, pipeline ID, applied content classifiers, offending categories, the prompt text, and more.

FIG. 2 is a flowchart of an example method for dynamic management rule enforcement and AI model routing. At stage 210, the rules engine receives an input. The input can include one or more queries. At stage 215, management rules are retrieved based on policies that apply to the user or to a group or tenant to which the user belongs. This can include adding a DLP policy at stage 220. The DLP policy can be retrieved from a separate server, in one example, such as by supplying identifying information of the user, group, or tenant.

Remediation can be applied to the input, such as by transforming a portion of the query into a contextual placeholder. Additionally, based on a rules evaluation (including the DLP policy) with regard to the input, the rules engine can route the input to either an LLM in the cloud at stage 225 or a local LLM at stage 230.

The rules engine can receive an output from the destination model at stage 235. The rules engine can perform a reverse transformation by replacing the contextual placeholder in the output with the original text from the input. Then, at stage 240, the modified output can be transmitted back to the application.

Figure 3A:
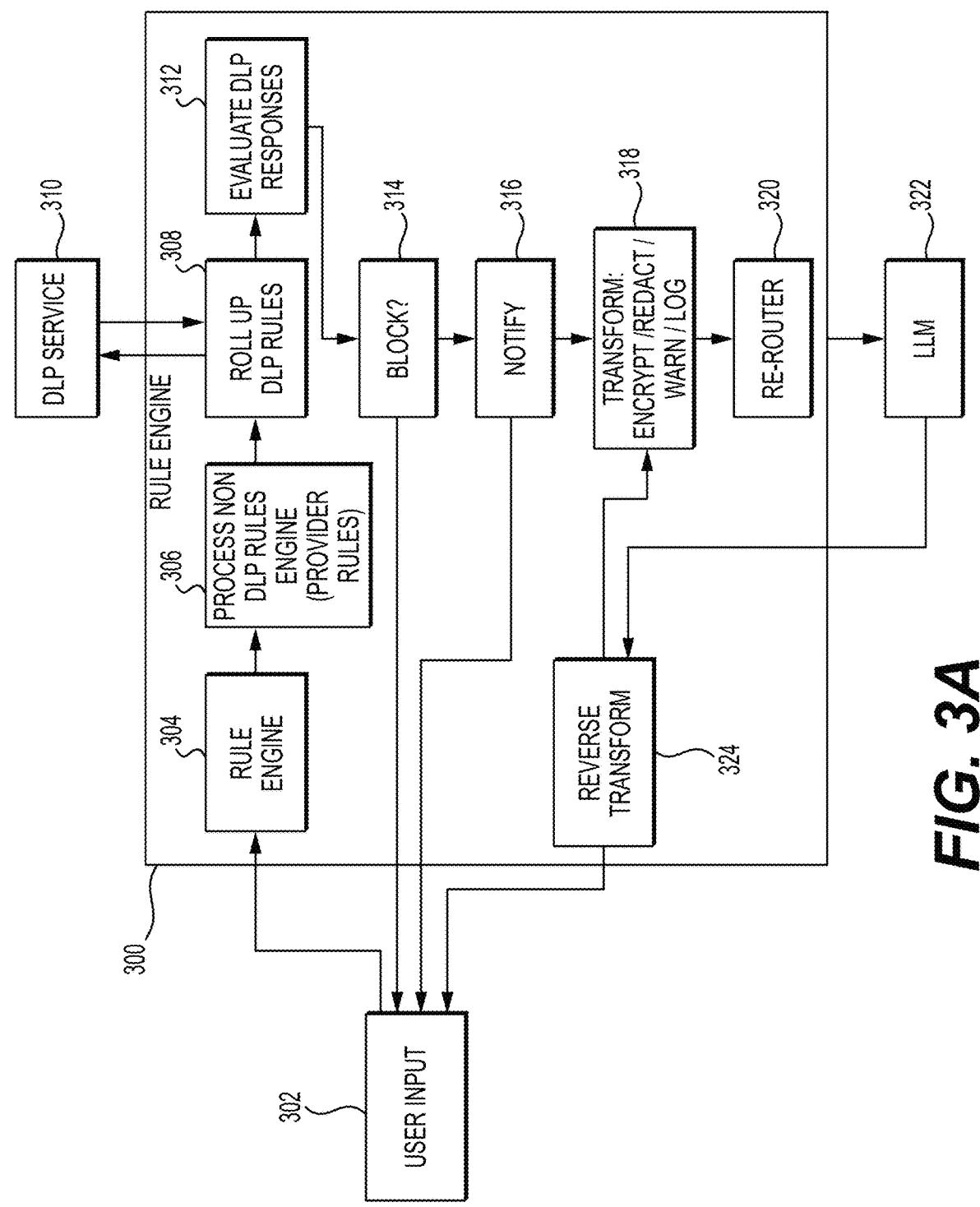
FIG. 3A is a flowchart of an example method for dynamic management rule enforcement and AI model routing using a rules engine.

FIG. 3A is a flowchart of an example method for dynamic management rule enforcement and AI model routing using a rules engine. Various stages 300 execute as part of the rules engine. At stage 302, user input is received. The input can be text from an AI pipeline, such as a query. The AI pipeline can execute as part of an AI platform or some other application. In one example, the input is received from a proxy or gateway that the application sends the input to. The application can include an endpoint to the proxy, with an API key that is used at the proxy or the rules engine.

At stage 304, the rules engine receives the input. The input includes application context that allows the rules engine to identify which management rules to apply to the input. The management rules can come from multiple sources. For example, a tenant or customer can set up various management rules on the AI platform or through UI access to the rules engine. The management rules can include PII filters, security filters, moderation filters, and enterprise content filters. These categories can represent different types of content to limit, exclude, or modify prior to or after allowing the input to reach a default model.

In one example, some categories of rules are processed separately, such as by using different models to generate remediation scores for the separate categories. In the example of FIG. 3A, at stage 306 the non-DLP rules are separately processed. These can be rules related to moderation, such as speech that could be considered hateful, harassing, or sexual in nature. The input can be searched for key terms that require moderation. A trained model can be used. The model can detect queries likely to illicit outputs that would require moderation.

Stage 306 can also include selecting a model to use or even identifying the default model. The default model can be identified prior to remedial actions, which can result in rerouting to an alternative model. The default model can be indicated as part of the input, in an example. A step can also include conditional statements for selecting the model based on what default is indicated by the input. For example, if the input indicates model A, then use model B.

At stage 308, DLP rules can be rolled up from a separate service or repository. Using a user identifier or tenant identifier, the rules engine can request the DLP rules from a DLP service at stage 310. Alternatively, the rules engine can request a remediation score from the DLP service at stage 310. The rules engine can send user context, the input, and an identifier (e.g., user identifier or tenant identifier) that allows the DLP service to retrieve the relevant DLP rules.

With a DLP-related remediation score, the rules engine can evaluate the DLP response at stage 312 and determine what remedial to take. This can include comparing the DLP remediation score to a series of thresholds. When a high threshold is met, the rules engine can block the input from reaching the default LLM at stage 314. The rules engine can send an output back to the source of the input. The output can take multiple forms. For example, the output can be a notice at stage 316 that indicates that the LLM was not contacted and can identify a DLP rule as a reason why. Alternatively, the output can be generated by a local language model and represent an attempt to reply to the input without using the default LLM. For example, an on-premises language model that is trained for such responses can respond to the input. Either way, the output can be synthesized rather than retrieved from the default LLM. The output can meet a format expected of an output from the default LLM, ensuring that the source application does not crash or otherwise break.

Alternatively, if the DLP remediation score meets a medium threshold, at stage 318 various non-blocking remedial actions can occur. For example, a portion of the input can be subject to a reversible transfer. This can include encrypting PII by replacing it with a code or contextual placeholder. This can also include redacting and eliminating portions of the query that are offensive or likely to cause the retrieval of disallowed content. A local model can identify those portions of the input, in an example. Or a regex comparison can identify words within the query that should be redacted or replaced.

In one example, a warning message is sent to the user, allowing the user to elect whether to send the modified input to the default model (or some alternative model). The user's election, the rule violations, and the input, can be logged for future auditing.

At stage 330, routing rules are applied based on the remediation scores, application context, and input subject matter. This can include selecting an on-premises model or a different version of the default model as the destination model. At stage 322, the destination model receives the modified input and returns a result. The result can be subject to a reverse transform at stage 324. That is, the rules engine can decrypt or replace information in the result that is the encrypted or contextual placeholder inserted at stage 318. The modified output is then sent back to the source of the input.

Figure 3B:
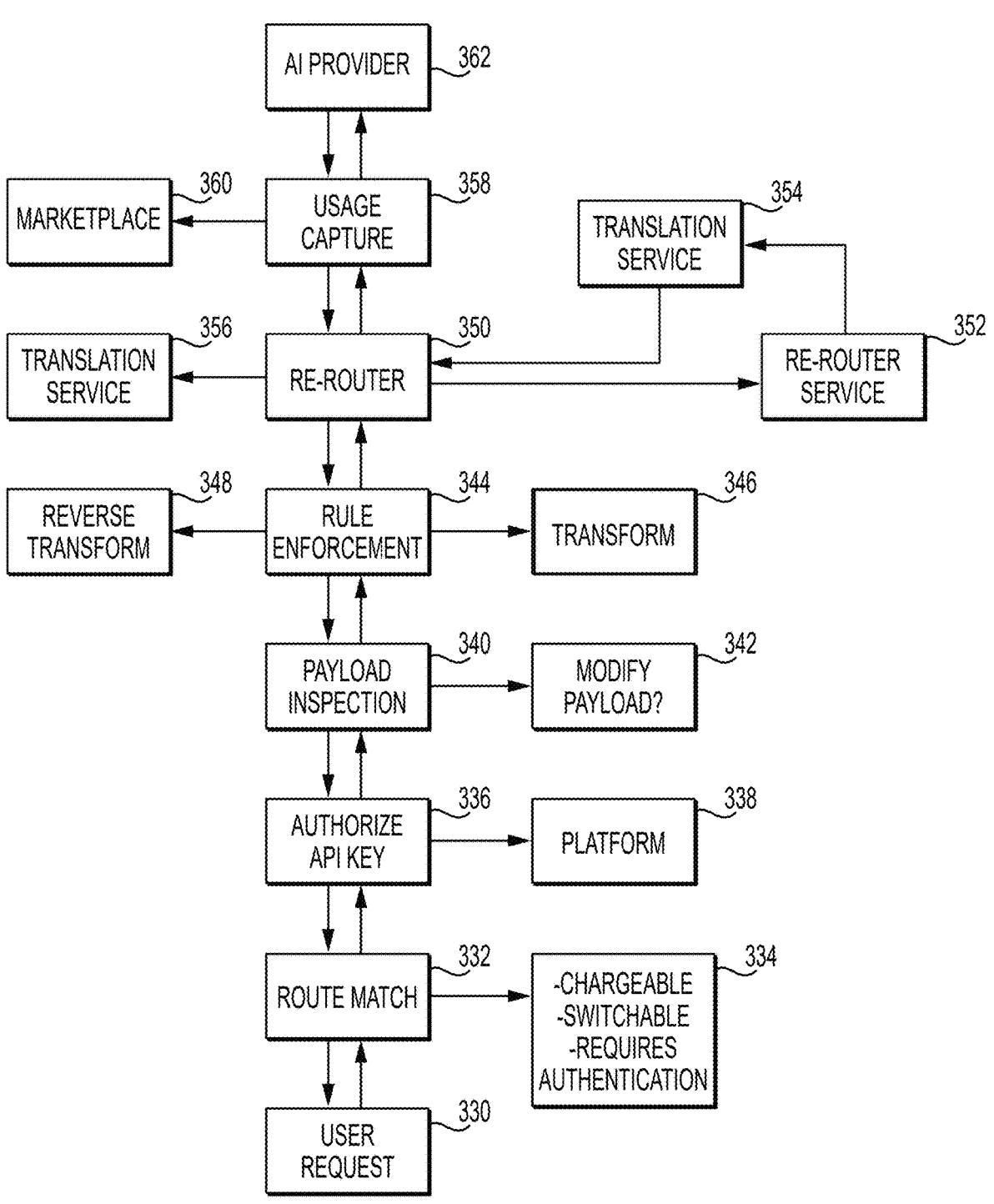
FIG. 3B is a flowchart of an example method for dynamic management rule enforcement and AI model routing using a gateway.

FIG. 3B is a flowchart of an example method for dynamic DLP enforcement and AI model routing using a gateway. The flowchart flows in a bottom-up direction. A gateway is one way to address customer needs. The customer might already have an application that uses an AI model. However, the customer still needs DLP and other management rules. The customer can modify its application to instead contact the gateway instead of directly calling the default AI model. Then the gateway and rules engine can apply management rules and determine what modifications and routing are required for the inputs.

At stage 330, a user request is received. A customer application can call the gateway by including an endpoint URL in the application, along with a gateway API key. No other code changes are necessary, in an example.

At stage 332, the gateway finds a matching route for the input. The route includes the default model as a destination. At stage 334, the gateway can determine whether the model is chargeable, switchable, and whether it requires authentication. Based on these factors, the default model can be selected or altered, in an example.

At stage 336, the API key is authorized, including checking the user or device status with an AI platform at stage 338. Application context can be retrieved from the AI platform based on the authorization, in an example.

At stage 340, the gateway can inspect the payload and, where appropriate, modify the payload at stage 342. For example, a normal string request to OPENAI, by default OPENAI will not return the token cost. But the token cost is relevant to AI management and potential routing decisions. Therefore, the gateway will modify the payload by including a request for token cost.

At stage 344, the rules engine can enforce management rules. This can include remedial actions, such as blocking a transmission, or transforming some aspect of the input at stage 346. The transformation can be reversible, such that the original portions of the input can be restored for reference in the output by a reverse transformation at stage 348. At stage 350, a re-router process of the rules engine can route the modified input to a destination model. In one example, an external re-router service can be utilized at stage 352. The re-routing can cause the input to be sent to an alternative model rather than the default model. The re-routing can include invoking a translation service at stages 354 or 356 to change the wrapper around the input to include values that will work in an API call to the destination model.

At stage 358, the rules engine can cause the system to capture usage. That can include the inputs, outputs, and properties of the inputs. The rules analysis can also be captured, along with routing decisions and modifications made to the inputs. The logging can be stored in a datastore for future auditing.

The logged information can also be used to make recommendations for pipeline elements in a marketplace at stage 360. This can include surfacing models, datasets, prompts, tools, and scripts relevant to the user's inputs and outputs at the gateway.

At stage 362, the modified input can be sent to a destination model at an AI provider, in an example.

Figure 4:
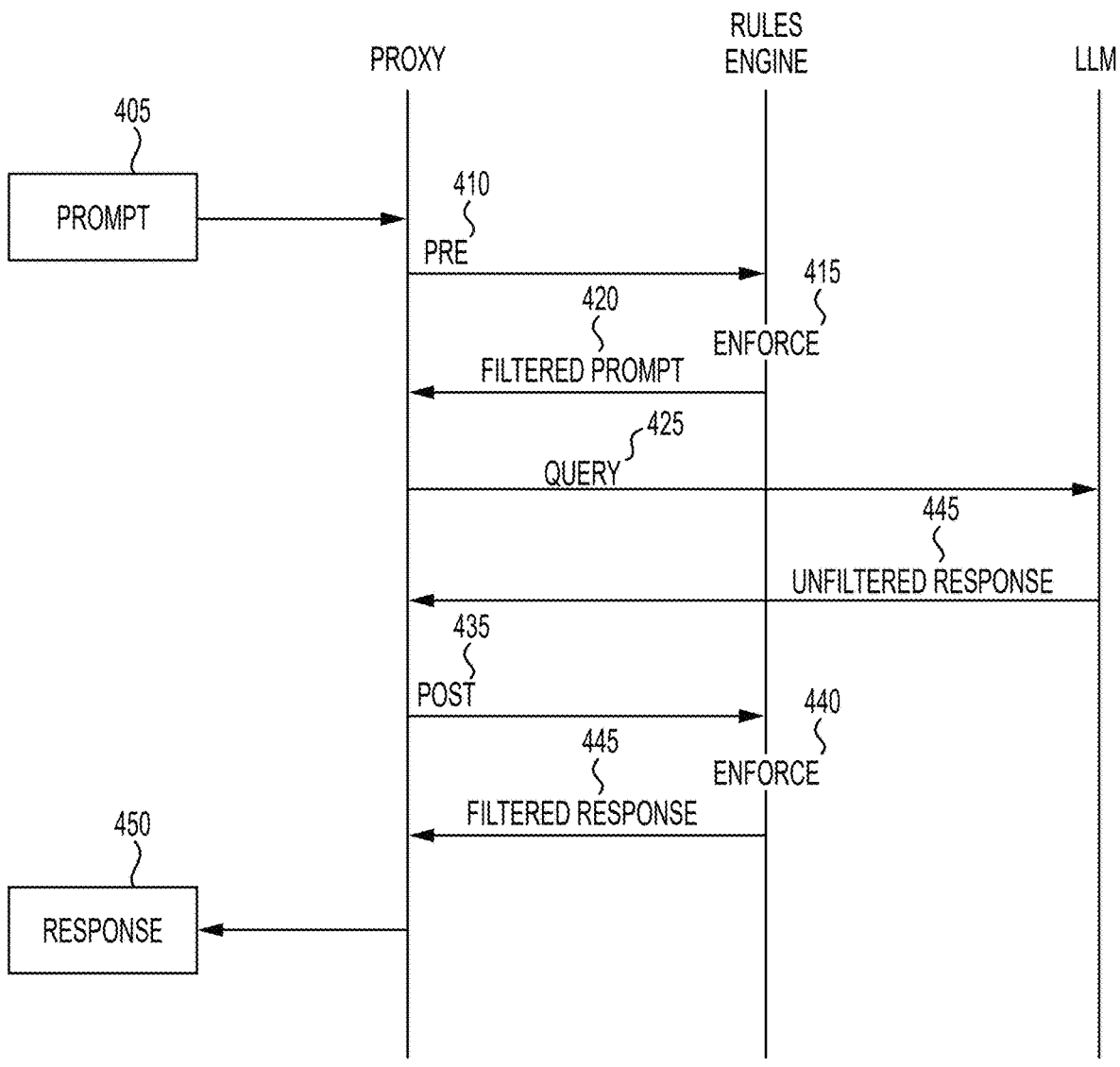
FIG. 4 is a sequence diagram of an example method for dynamic management rule enforcement and AI model routing.

FIG. 4 is a sequence diagram of an example method for dynamic DLP enforcement and AI model routing. This sequence diagram illustrates how easily a proxy server (acting as a gateway) can integrate a user application with the rules engine. At stage 405, a user device sends a prompt (one type of input) to a proxy server. The proxy server can be located at an address specified by an endpoint in an application being executed by the user. The endpoint can be coded into the application or downloaded as part of application execution, such as from a management server that manages execution of the application. The prompt can be specified by the application, such as a system prompt, or customized in a UI by the user. When the user takes an action in the application, such as selecting a submit button, the prompt is sent to the endpoint, transmitting the prompt to the proxy server.

At stage 410, the proxy server pre-processes the prompt by sending it to a rules engine rather than directly to a destination LLM. In one example, additional application context can be added to the prompt, such as an identity of a user or tenant based on identification processes and information accessible by the proxy.

At stage 415, the rules engine can utilize the application context to locate management rules that apply to a user. These can be a subset of total management rules that are assignable on the AI platform affiliated with the rules engine. The management rules can be applied to the prompt based on the application context. For example, different rules can have different weights depending on the application and depending on past rule violations by the user. In one example, a remedial action score can dictate modifying the prompt, such as by replacing PII with contextual placeholders. The modified input, called a "filtered prompt" in this example, can then be sent back to the proxy at stage 420. This can allow the proxy to perform any additional actions on the modified prompt before sending it as a query at stage 425 to the LLM.

Notably, even the LLM can be selected by the rules engine. For example, the remediation score and management rules can dictate an on-premises LLM instead of the default third-party off-premises LLM. The destination LLM can be identified to the proxy in an example. In another example, the rules engine contacts the LLM on the proxy's behalf. In that case, stage 420 can be skipped or stage 425 can be broken into an acknowledgment by the proxy that causes the rules engine to send the query to the LLM on the proxy's behalf.

At stage 430, the LLM sends a response to the query. The response can be unfiltered. The proxy can perform post-processing on the response at stage 435. This can include sending the response to the rules engine, which then applies the management rules to the unfiltered response. The rules engine can enforce the rules in various ways at stage 440. For example, a series of moderation and security checks can occur, such as ensuring that offensive material or system prompts are not being sent back to the user. Additionally, reverse transformation can occur, in which the rules engine locates contextual filters in the response and replaces them with the original subject matter from the prompt. To do this, the rules engine can maintain a cache of removed portions and corresponding contextual placeholders, stored in association with the user and the specific query. This can ensure that the reverse transformation does not accidentally reveal PII in the wrong response.

The modified response, called a "filtered response," can then be sent to the proxy server at stage 445. The proxy server can then perform any additional checks and formatting to the filtered response, and send the final modified response as the response at stage 450.

FIG. 5 is an illustration of an example UI for setting tenant management rules. Screen 500 can be accessed by an administrative user with appropriate credentials for setting management rules that apply to a user, group, or tenant. The UI can be a web interface, accessible over a network, such as at the website of an AI platform.

In this example, four groups of management rules exist: PII filters 510, security filters 520, moderation filters 530, and enterprise content Filters 540. Another group for management rules can include AI model provider restrictions, which will be discussed below. The illustrated groups are referred to a filters because they can be used to block or modify inputs that contain portions of content that meet the various categories of management rules. As shown, each group includes a list of management rule categories. For example, the categories 512 of PII filters 510 includes: names, phone numbers, SSNs, credit card numbers, bank accounts, passport numbers, driver's licenses, physical addresses, and IP addresses. The administrator can select any number of these categories 512 that should apply to the user, group, or tenant by selecting the respective radio buttons.

Additionally, the categories 514, 532 include remedial options. For example, each PII filter 510 category 512 includes a redact 514 option, an allow and flag option 512, and a weight slider 518. Moderation filter 530 categories 532 likely include a block option 531, allow and flag option 536, and a weight slider 538. Similar options exist for the security filters 520 and enterprise content filters 540. A redact option 514 can be used to remove PII from an input and replace it with a contextual placeholder. An allow and flag 516 can allow the PII but note the PII in the logging. Similarly, a block option 531 can cause the input to be blocked based on the moderation category. A weight slider 518, 538 can be used to adjust the severity of the particular management rule. With respect to PII filters 510, this can adjust the sensitivity used in recognizing and redacting the PII. With respect to moderation filters, this can adjust the sensitivity used in concluding that the content is subject to moderation.

The enterprise content filters 540 can be used to apply management rules to specific data objects, such as vector databases and other enterprise assets that can be accessed by an AI pipeline. Some groups can have access to a datastore whereas others cannot, for example. The enterprise content filters can block the user, group, or tenant from accessing the dataset with the application as part of an input to an AI model.

A filter simulation window 555 is also provided on the UI. This can allow the administrator to test various queries to see how the rules engine will apply the management rules under the current rules configuration. A user can type a query in the filter simulation window 555, select submit 550, and see the resulting modified input and, in one example, the modified output of an AI pipeline that uses the rules engine.

Each group of management rules can be given a separate remediation score, in an example. This can ensure that, for example, a reroute or block based on AI provider restrictions is not impacted by a low score in other groups, such as PII.

Another group for management rules can include AI model provider restrictions 541. The provider restrictions can look for content that is restricted by some AI service providers. In the example UI, the provider restrictions are divided into four categories, including high sensitivity, general sensitivity, context specific, and high risk context. Drop down boxes allow the user to add more or fewer of the provider restrictions in each category.

Some example high risk provider restrictions include Involves PII (any), Involves Biometric Data, Involves Surveillance, and Involves Explicit Content. Example general restrictions include Involves Fraud or Deception, Involves Falsities or Dishonesty, and Involves Factual Omissions. Context specific restrictions include Involves Healthcare or Medical Services, Involves Financial Services, Involves Legal Services, and Involves Government or Law Enforcement. High risk context includes Involves Autonomous Processes, Involves Transportation Systems, Involves Power Generation or Transmission, Involves Critical Medical Systems, and Involves Military Systems.

Each provider can have its own terms of service, with some types of content being disallowed. To avoid potential liability, it can be important for a tenant or user to not submit the disallowed content types to the provider. Therefore, a model can separately score categories of provider restrictions. The provider restriction categories can automatically account for those in the terms of service for use of the default model and other potential alternative models. The destination model can be selected as one where the input meets the respective AI model provider restrictions. The provider restriction scores can indicate the presence of a provider restriction with the respective score exceeds a threshold. Different thresholds can exist for different stringency levels of provider restrictions.

Rule detection for the AI model provider restrictions can be done in a tiered fashion, with high stringency down to least stringent, in an example. As a high-stringency example, if the rules engine detects that the input includes any of the high-sensitivity restrictions or is from a high-risk application (e.g., a blacklisted application), the remedial action can be to block the input, log the input and the restriction, and notify the administrator or supervisor user. As any AI model provider restrictions in a next tier down are detected, the input can be blocked but some automated action through a tool can occur.

When a lower stringency AI model provider restriction is present in the input, the user can be prompted with a synthetic output to confirm that they agree the response will be used for informational purposes only and that they will seek qualified expert advice before implementing any recommendations provided by the LLM. This interaction can be logged for auditing purposes.

If a still lower stringency AI model provider restriction is present in the input, then the rules engine can cause injection of a prompt to cause the destination LLM to override blocking of the query. For example, the LLM might be restricted from answering as a doctor. The injected prompt could state "I understand that this is for informational purposes only and that I should consult a qualified expert before implementing any recommendations provided by the LLM." The rules engine can also modify the output, such as at the reverse transform stage 235, to include a statement that reiterates the notion of the injected prompt. For example, the statement could say "This is for informational purposes only and you must consult a qualified expert before implementing."

In one example, the rule engine performs routing based on how the AI model provider restrictions align with the terms of service restrictions of the various model providers. For example, the evaluation of the AI model provider restrictions can include identifying which of the available destination models have the fewest common restrictions with those detected in the input. If the default model has provider restrictions found in the input but an alternate model does not, the rules engine can route the input to the alternate model.

Some example high-sensitivity provider restrictions can include: use for collecting personal data without consent is prohibited; use for processing personal data without legal compliance is prohibited; use for disclosing personal data without authorization is prohibited; use for inferring personal information from data sources without permission is prohibited; use for generating personal data without meeting legal requirements is prohibited; use for facial recognition for identification is prohibited; use for biometric systems to assess individuals is prohibited; use for storing or sharing biometric data without consent is prohibited; use for deploying biometric identification tools without compliance is prohibited; use for facilitating spyware to monitor individuals is prohibited; use for unauthorized communications surveillance is prohibited; use for unauthorized monitoring or tracking of individuals is prohibited; use for covert data collection or tracking is prohibited; use for building tools with sexually explicit content for minors is prohibited; and use for building tools with sexually suggestive content for minors is prohibited.

Example general AI provider restrictions include use for generating or promoting disinformation is prohibited; use for generating or promoting misinformation is prohibited; Use for creating false online engagement (e.g., comments, reviews) is prohibited; use for impersonating another individual without consent or legal right is prohibited; use for impersonating an organization without consent or legal right is prohibited; use for engaging in or promoting academic dishonesty is prohibited; and use for deploying automated systems (e.g., chatbots) without disclosing AI interactions when not obvious is prohibited.

The AI provider restrictions can also include context-specific requirements. These can related to particular vocational contexts in which the model cannot offer advice, diagnosis, or other professional opinion. One restricted context is healthcare and medical. These restrictions can include use for providing medical diagnoses is prohibited; use for prescribing medication is prohibited; use for offering treatment plans is prohibited; use for interpreting medical tests or results is prohibited; use for personalized medical advice or consultations is prohibited; and use that advises individuals in ways that may put the individual's health at risk is prohibited.

Another restricted context is financial services. These restrictions can include: use for offering investment advice is prohibited; use for predicting stock or commodity prices is prohibited; use for personal financial planning is prohibited; use for generating financial audits or official reports is prohibited; use for creating or promoting financial scams or fraud is prohibited.

Another restricted context is legal services. These restrictions can include: use for providing legal advice or counsel is prohibited; use for drafting legal contracts or agreements is prohibited; use for interpreting laws, regulations, or legal outcomes is prohibited; use for representing individuals or entities in legal matters is prohibited; and use for creating legally binding documents is prohibited.

Another restricted context is government and law enforcement. These restrictions can include use for impersonating government officials or agencies is prohibited; use for interfering with electoral processes or voting is prohibited; use for generating disinformation about government policies or events is prohibited; use for unauthorized surveillance or data collection is prohibited; and use for profiling individuals without consent is prohibited.

Another restricted context is high-risk applications. These restrictions can include use in autonomous vehicle navigation or control systems is prohibited; se in air traffic control or aviation management systems is prohibited; use in operating nuclear facilities or power grids is prohibited; use in life-critical medical devices or equipment is prohibited; and use in military weapon systems or targeting applications is prohibited.

A model trained on AI provider restrictions can receive an input and identify which of the provider restrictions are present, with a severity score for each.

Figure 5A:
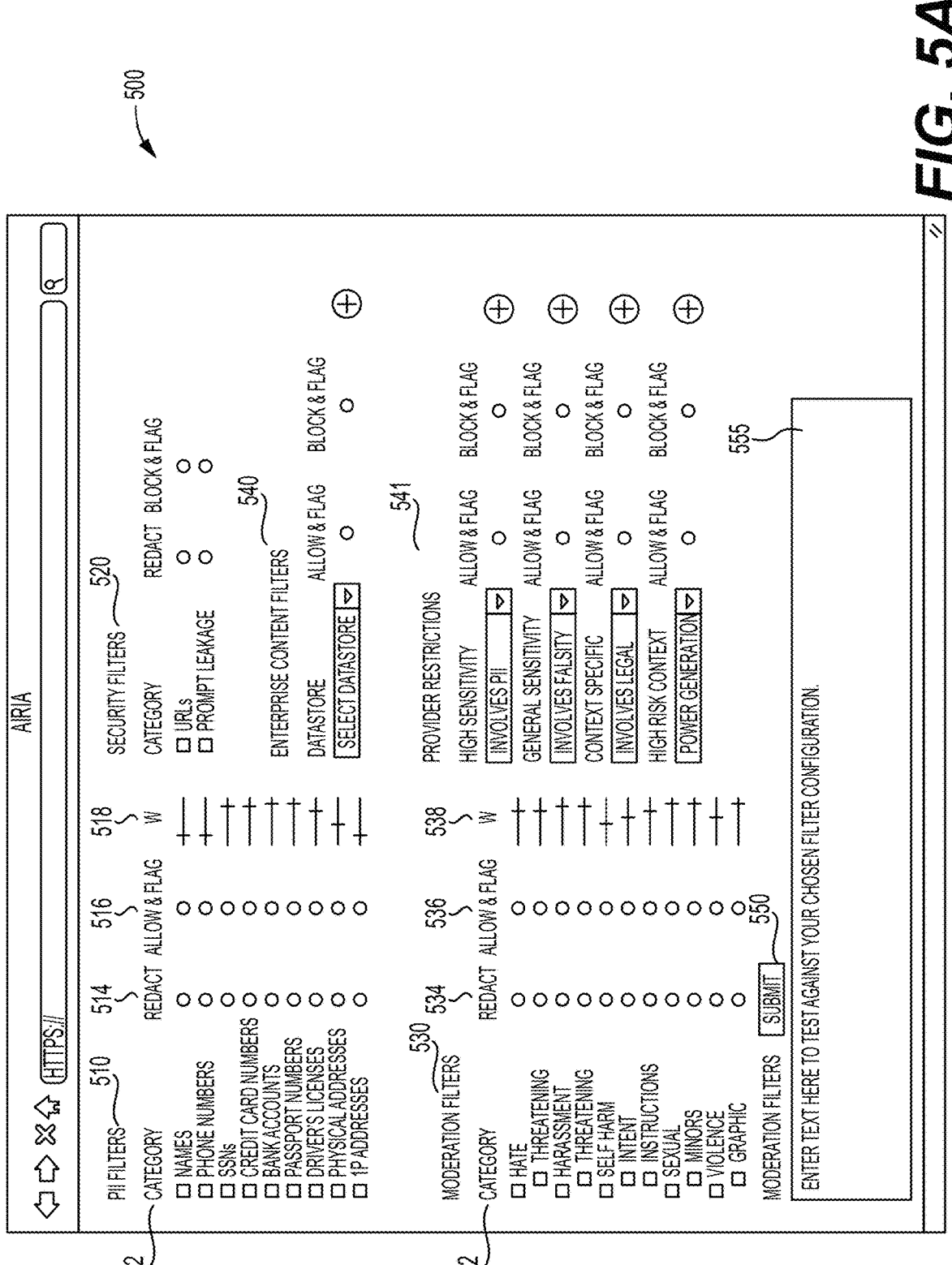
FIG. 5A is an illustration of an example UI for setting tenant security policies.
Figure 5B:
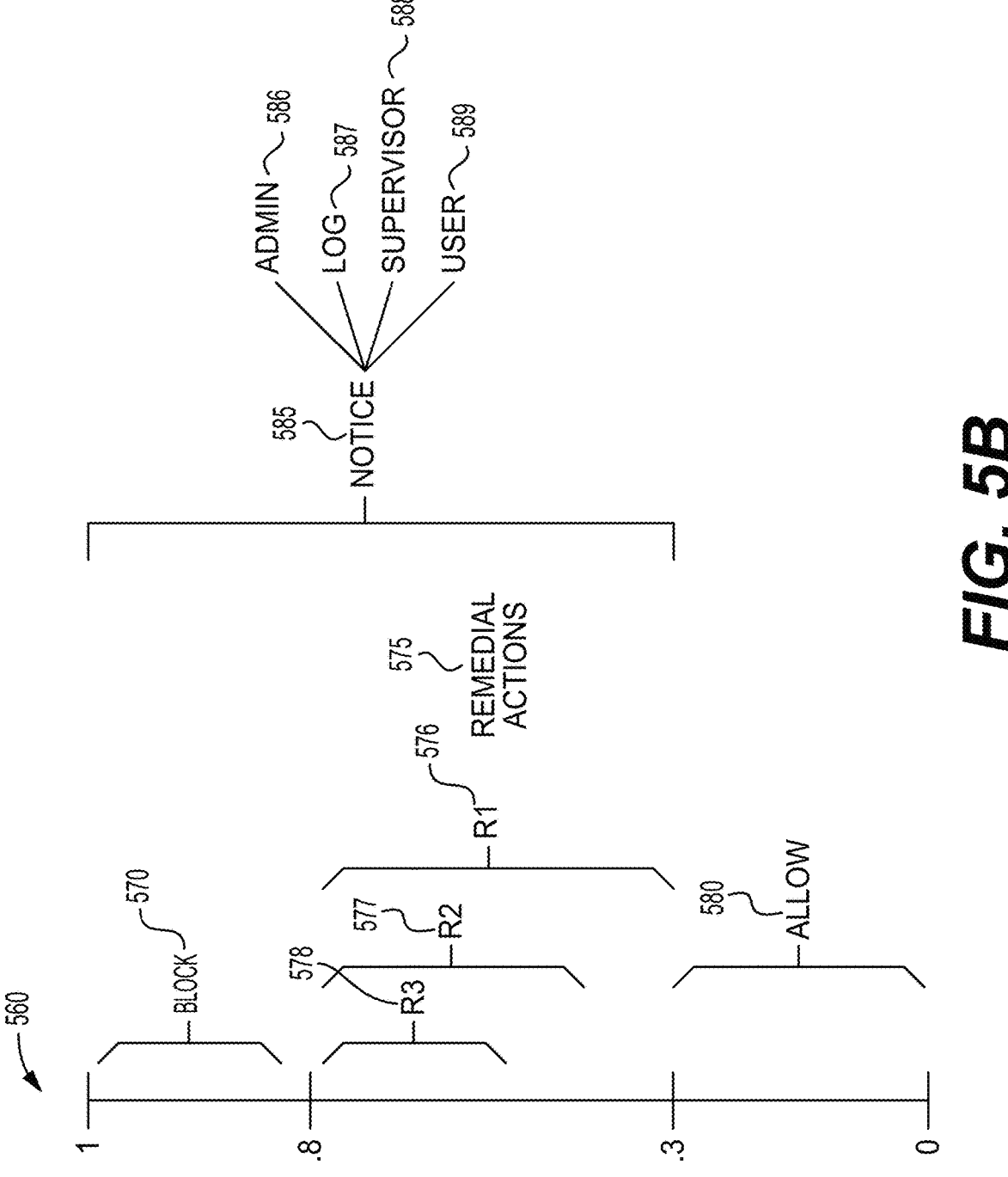
FIG. 5B is an illustration of example remedial action thresholds.

FIG. 5B is an illustration of example remedial action thresholds. A similar visual can be shown on the UI to the administrator, allowing the administrator to adjust thresholds and remediation regions. Remediation score scale 560 ranges from 0.0 to 1.0. A 0.0 score can represent no management rule detection at all, with the lowest possible remediation. A 1.0 can represent maximum management rule detection, with the highest possible remediation.

This example includes multiple different thresholds, including at 0.3 and 0.8. In between 0.3 and 0.8 are three additional categories of remediation, denoted by two additional thresholds. The first threshold at 0.3 indicates an allowance classification 580. When the remediation score is less than 0.3 in this example, the input is allowed and gets transmitted to the default model without alteration based on management rules. Likewise, the 0.8 threshold can indicate a blocking threshold, where a remediation score above 0.8 results in the input being blocked from transmission to the default model.

In this example, three different remediation regions R1 576, R2 577, and R5 578 are shown. These regions represent the more severe remedial actions 575 that are put into place as the remediation score climbs towards 0.8. In one example, the administrator can visually see which remedial actions 575 are assigned to which region R1, R2, and R3. The remedial actions 575 can include routing to an on-premises model, redacting, warning but allowing the input upon user approval, and other remedial actions up to blocking. In this way, in addition to setting weights in the UI of FIG. 5A, the administrator can change the thresholds and associated remedial actions taken in the UI of FIG. 5B. In one implementation, the remedial actions selected in FIG. 5A only apply with the appropriate threshold is reached in the UI of FIG. 5B.

Additionally, the UI of FIG. 5B can allow for defining a Notice range 585. This range can indicate when to transmit a message notifying the user of the management rule detection. Multiple different notification settings are also available. For example, an admin notice 585 can result in an alert to the administrator and can be set as the most serious, with a different range than the user notice 589, which can be set as the most sensitive. A supervisor notice 578 and a logging notice 587 can be set at different remedial thresholds.

Figure 6:
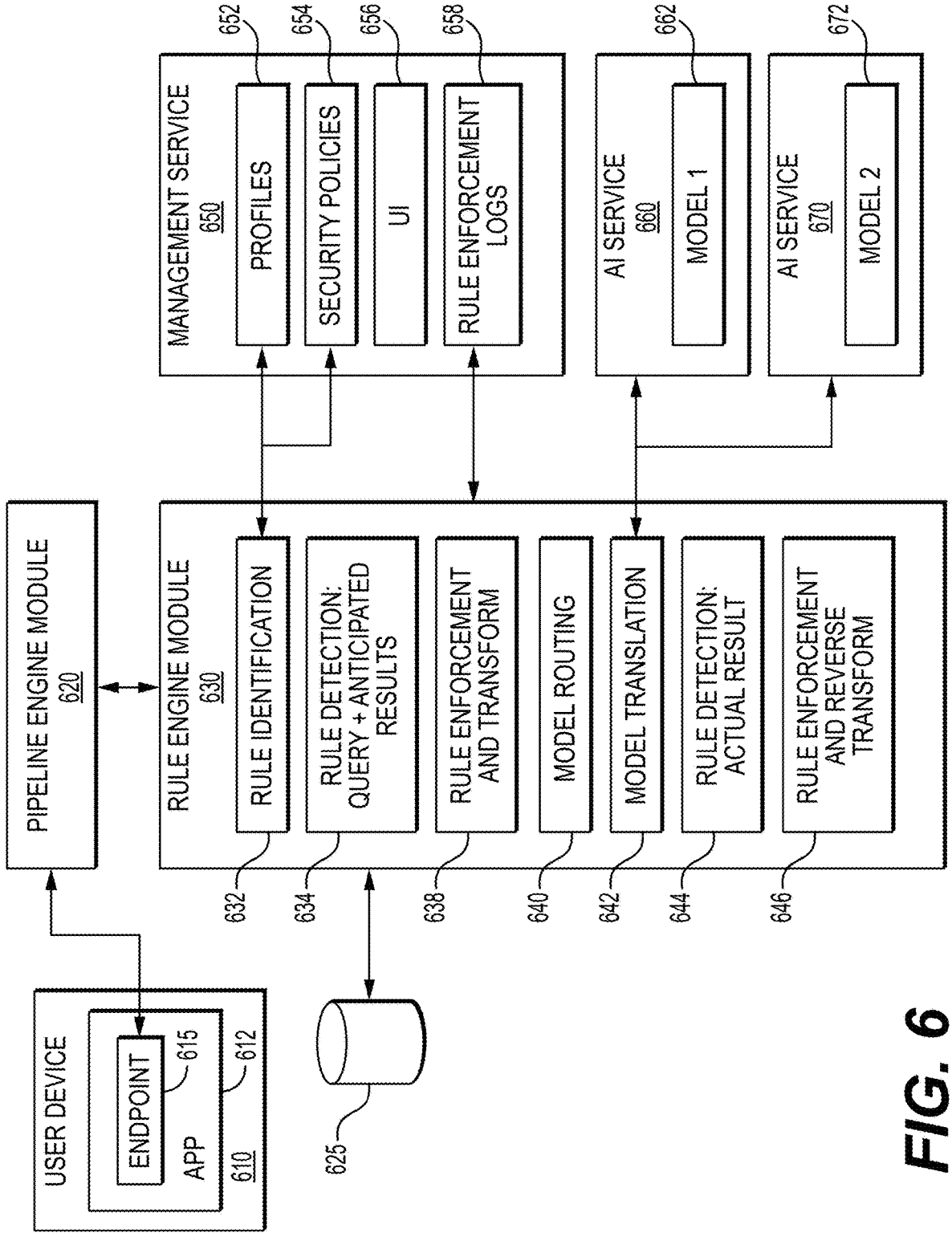
FIG. 6 is an illustration of example system components for dynamic management rule enforcement and AI model routing.

FIG. 6 is an illustration of example system components for dynamic management rule enforcement and AI model routing. A user device 610 can execute an application 612 that utilizes an AI pipeline. The user device can be any processor-based device, such as a phone, tablet, laptop, or personal computer. The application can include an endpoint 615 that is used to access some or all of the AI pipeline. The endpoint 615 can be an address for a pipeline engine module 620, which can be one or more processes that execute on one or more physical servers. For example, the pipeline engine module 620 can operate on a proxy or gateway server. The pipeline engine module 620 can also operate in the cloud, or as part of an AI platform.

The pipeline engine module 620 can rely on a rule engine module 630 for enforcing rules on inputs from the application 612 prior to those inputs being transmitted to a default AI model, such as model 1 662 at AI service provider 660. The rule engine module 630 can comprise one or more processes that execute on one or more physical servers. The rule engine module 630 can execute various stages discussed above.

The rules can be applied differently to different users, who are tracked via profiles 652 that are stored by a management server 650. The management service 650 can be part of the AI platform and can execute on one or more processors. The profiles 652 can track information about users, groups, and tenants. The tenants can be customers or customers of customers. The groups can be divisions within those tenants, such as a developer group or an executive group. Various management rules, called security policies 654, can be associated with the different profiles 652. For example, the management rules discussed with regard to FIG. 5A can be stored as security policies 654 and the assignment of those rules to particular users, groups, and tenants can be stored with the profiles 652. The management service 650 can include a UI, which can be code that gets rendered on a screen by the user device 610. The management service 650 can also include rule enforcement logs 658. These logs can track the various inputs, outputs, rules implicated, and remedial actions taken.

At stage 632, the rule engine module 630 can identify management rules based on application context. This can include matching the application context against one or more profiles 652. For example, the application can supply a user identifier, or a device identifier can be matched to a user, which in turn is matched to a group or tenant. The matched profiles 652 can indicate which security policies 654 (and other management rules) apply to that user.

At stage 634, the rule engine module 630 can evaluate the rules with respect to the input query and anticipated result of the query. This can be done by inputting the rules, user information, and a query portion of the input to one or more trained remediation models 625. The remediation model can reside at the server where the rules engine module 630 executes or elsewhere, such as in the cloud. The remediation model can return one or more scores and indicate which portions of the query various rules and scores apply to. At stage 638, the rules engine module 630 can enforce the rules and, where applicable, reversibly transform portions of the query.

At stage 640, the management rules and remediation scores can dictate whether to route the modified query to an alternative model, such as model 2 at AI service provider 670. Different remediation scores across different management categories can dictate whether the routing should take place. For example, a high remediation score in the enterprise category can be tied to routing the modified query to a on-premises model, whereas a high score in the moderation category can still use the same default model.

Additionally, the rule engine module 630 can access provider restrictions, which can differ between the AI service providers 660, 672 and between models 662, 672. As will be discussed below, the input from the user device can be evaluated as part of rule enforcement stage 638 to detect provider restrictions. The provider restrictions can be stored by polling providers and accessing terms of service (ToS) restrictions through provider repositories or by scraping the information. The provider restrictions can be grouped into categories, and the rules engine or some other service can track which providers have which categories of restrictions. The rules engine can use a model to detect the categories within the input and score the severities. Based on which models disallow the categories in the input, the rules engine module 630 can select a provider where the input is allowed. Alternatively, if the severity is medium, the rules engine module 630 can inject a prompt with a disclaimer intended to satisfy system prompts at the default AI service provider that may otherwise block the input.

At stage 642, the rule engine module 630 can perform model translation. This can include mapping attributes of the modified query to fields that are required for an API call to the destination model. For example, model 1 662 can have different API requirements than model 2 672.

The rule engine module 630 can then receive an output from the destination model. The rule engine module 630 can perform rule evaluation on that output at stage 644, and then enforce rules where they apply at stage 646. This can include a reverse transformation, where contextual placeholders in the output are reverted back to their original PII or other information.

Figure 7:
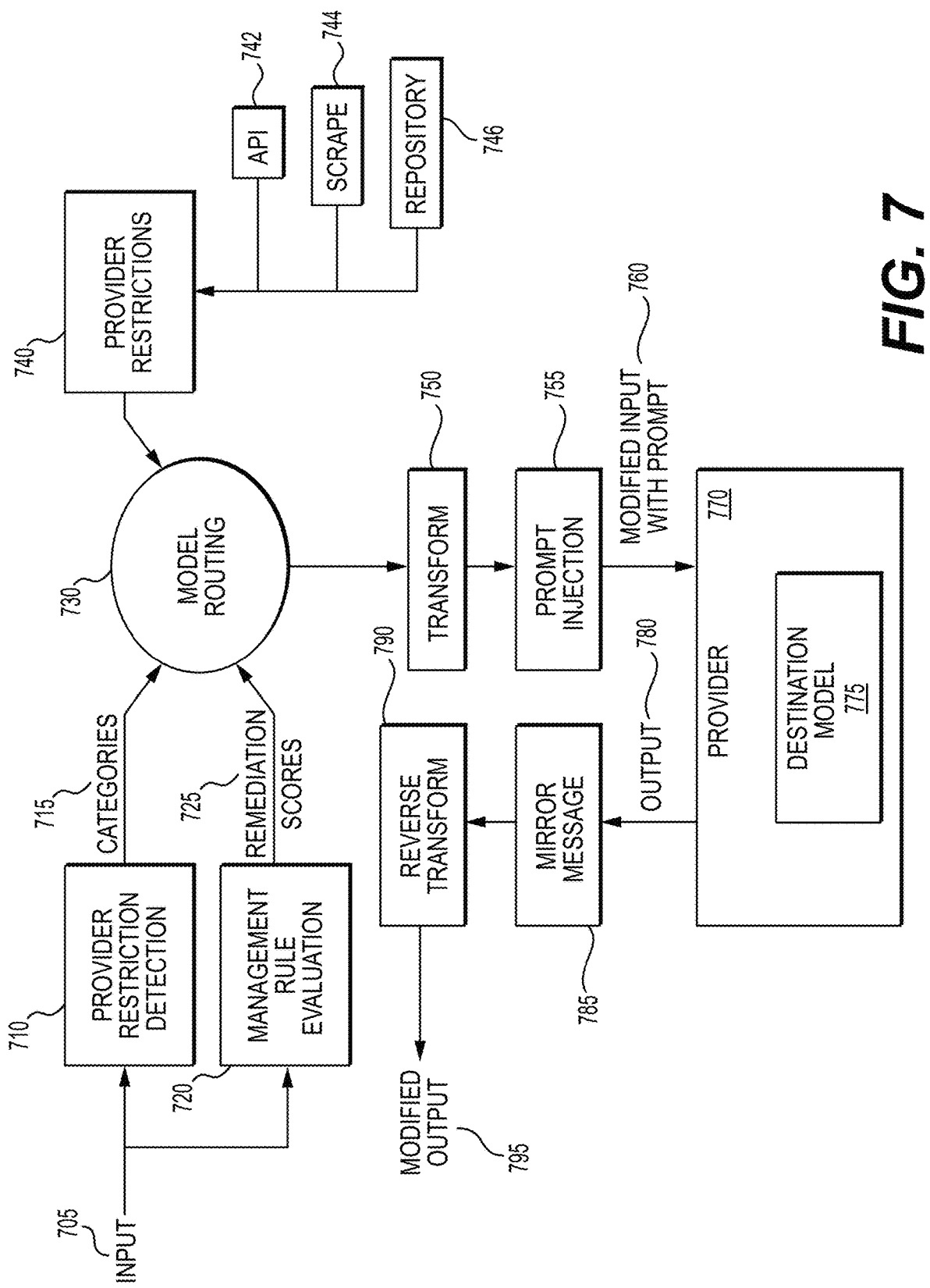
FIG. 7 is a flowchart of example stages for dynamic enforcement of provider restrictions as part of AI model routing.

FIG. 7 is a flowchart of example stages for dynamic enforcement of provider restrictions as part of AI model routing. At stage 705, the rules engine can receive an input. The input can originate at a user device that is accessing a stand alone application or the AI platform, either of which can initiate execution of an AI pipeline. The input can be for use with a default AI model. Multiple stages of evaluation of the input can be performed by the rules engine. The management rule evaluation of stage 720 has largely been discussed above. Various different remediation scores can be generated by one or more models that review the input in view of applicable management rules for that user, group, or tenant (deducible from application context). A different remediations score for each category of management rule is possible, in an example. Those remediation scores can be input into a routing module of the rules engine, in an example, for comparison against remediation thresholds that can determine remedial actions, including routing decisions.

In addition, at stage 710, the rules engine can detect provider restrictions in the input. The rules engine can use one or more models or services for the detection, in an example. Such detection can be important for minimizing liability issues for tenants or users. It is difficult for a large enterprise to ensure that employees are complying with the ToS of various providers. Tools have not previously existed for doing so in the context of AI service providers.

As part of the detection of stage 710, the rules engine can analyze a subset of provider restrictions. In one example, the rules engine only analyzes the input with respect to categories that apply to possible providers. Therefore, the rules engine can determine a list of possible providers of an AI service that can receive the input. For that list, the applicable categories of provider restrictions can be retrieved. Those applicable categories can be an input into the model or service for detecting the provider restrictions, along with the input, in an example.

At stage 715, the output of stage 710 can include the categories of provider restrictions that apply to the input of stage 705. Those categories of provider restrictions can be sent to the model routing module for routing considerations at stage 730.

In one example, the system can store provider restrictions at stage 740. These stored provider restrictions can be retrieved in multiple ways. First, a periodic process can be used to update ToS information. This can include polling service providers, such as through API calls at stage 742. Additionally, a scraper can execute at stage 744 that extracts ToS text for one or more providers and sends restrictions texts to a model for analysis and categorization. Likewise, one or more providers can offer repositories of restriction information, which can be searched or accessed at stage 746. These methods can be periodically executed. In one example, when a new version of a model is released, a process at the rules engine or AI platform looks for new provider restrictions using any of these methods.

These various methods can be used to populate a database or some other type of datastore that maps AI service providers to provider restrictions, and particularly to common categories of restrictions. The model routing module can retrieve categories of restrictions from the datastore for the models or providers being considered at routing stage 730. Additionally, if the provider restrictions 740 for a particular provider are outdated (exceeding a threshold for most recent update), the rules engine can attempt an API call at stage 742 to retrieve the provider restrictions in response to the input at stage 705, such as during the model routing analysis at stage 730.

As discussed with regard to FIG. 5A, the analysis of the provider restrictions in can be tiered. Therefore, a severity score or level can be passed along with the detected categories at stage 730. This can allow the model routing to process routing rules for each of the detected categories.

The provider (and model) selected can be one that meets the remediation scores and required remedial actions of stage 720 and the provider restriction categories and scores of stage 710. For example, the detected categories of stage 715 can limit the providers to a first subset, and the management rule evaluation and remediation scores can limit the providers to a second subset. The rule engine can then select between providers that exist in both subsets for where to send an input to a potential destination model. If there is no overlap, then the input can be blocked and a synthetic message can be sent back to the user device. In one example, the user can attempt to override a block, as discussed with regard to the other management rules.

Based on the management rule evaluation and routing, the rules engine can reversibly transform the input at stage 750. This can include replacing a portion of text, such as a name or other sensitive identifier, with a contextual placeholder. Additionally, the transformation can be based on the provider restriction detection. For example, if the provider disallows a context, such as a legal question, the rules engine can rephrase the input to remove that context.

At stage 755, the rules engine can perform prompt injection. The prompt can include a needed disclaimer to satisfy the ToS of the destination service provider and model. For example, to overcome or avoid a provider restriction against seeking medical advice, an injected prompt can state that the user is not seeking medical advice and understands that they must see a doctor for that. The injected prompt can also occur for a provider restriction category with a low to medium score (i.e., below a blocking threshold), where the rules engine decides to not block the input yet needs to prevent unexpected blockage by the service provider. Multiple such injected prompts for a single input are possible.

In one example, the rules engine stores prompts that associate to the various categories of provider restrictions, including provider-specific prompts. Based on the categories of stage 715, the rules engine can look up corresponding prompts for injection. The rules engine can use an identifier for a destination provider to look up provider-specific prompts for one or more of the relevant categories from stage 715.

The rules engine can track which transformations and prompt injections are made at stages 750 and 755 for purposes of conditioning the output from the destination model.

Based on the transformation and prompt injection, at stage 760 a modified input with the injected prompt can be supplied to the destination provider at stage 770. The destination model can receive the modified input, various prompts from the application or AI platform, the injected prompt from the rules engine, and return an output at stage 780. For example, the destination model 775 can be an LLM and the modified input can include a query.

At stage 785, the rules engine can insert a message into the output that corresponds to the prompt injected at stage 755. The message can mirror the prompt injection. For example, based on the medical-related prompt injection, the output can be appended with a message stating that the information should not be used as medical advice. In one example, the output is delivered in JSON or other such format where appended message has its own field for use by the backend application, which can separately display disclaimers.

At stage 790, the rules engine can reverse the transformation, such as by swapping the contextual placeholder in the output with the portion of text that was replaced at stage 750. The modified output can then be transmitted back to the user device at stage 795.

FIG. 8 is a flowchart of example stages for dynamic enforcement of provider restrictions as part of AI model routing.

At stage 810, a rules engine or other service can store provider restrictions that correspond to categories of restricted subject matter for providers of AI services. For example, many AI services have terms of service that preclude certain uses of the AI service. These precluded uses can be contextual, such as seeking medical or legal advice. The precluded contexts can extend beyond vocational advice. For example, high risk activities such as automated driving can be prevented from using the model. A service provider might also disallow religious, political, or sexual interactions with the model. The service providers can be numerous, and the rules engine can maintain a datastore with restricted categories pertaining to the various providers. The restricted subject matter categories can be identifier for particular providers, such as a first provider and a second provider, but supplying a provider identifier. The rules engine can use the stored provider restrictions to route an input, such as by determining which providers to use or avoid for a given input. The provider restrictions can be periodically updated by requesting the restrictions or scraping information from provider terms of service.

At stage 820, the gateway or AI platform can receive an input from an application executing on a user device. The endpoint URL and/or key can indicate a configuration where the application by default will utilize a first model at the first provider. For example, this can be the default model and provider for an AI pipeline that is handling the input. The AI pipeline can be executed by a pipeline engine that contacts the rules engine, providing the input.

At stage 830, the rules engine can detect which provider restrictions are implicated by the input. This can include detecting a first category of restricted subject matter. The first category can then be mapped to a first provider restriction of the first provider. For example, a repository of categories of restricted subject matter (e.g., categories of provider restrictions) can be mapped to identifiers for each provider that includes that provider restriction. Therefore, when a category of restricted subject matter is detected in the input, this can be matched against which providers forbid those same categories.

In addition to detecting provider restrictions, the input can still be evaluated based on the other management rules. Based on a management rule applying, the rules engine can modify the input with a reversible transformation. This can include replacing a portion of the input with a contextual placeholder. For example, a credit card number can be replaced with "credit card 1." This can prevent leakage of sensitive information while still giving enough context for a model to make sense of an input.

The management rules are identified based on application context, which can relate the input to a tenant. At least some of the management rules can include weights that are applied through a user interface (UI) by an administrative user, and that are tenant-specific. The weights can be used to calculate remediation scores for evaluating the input. If the remediation score for the input is above a first threshold for allowing the input and below a second threshold for blocking the input, the reversible transform can be performed.

At stage 840, detecting a provider restriction can cause the rules engine to inject a prompt for inclusion with the input. The injected prompt can relate to the first category of restricted subject matter. For example, the injected prompt can be a needed disclaimer to satisfy system rules of the provider that may other block access to the model based on the input including the restricted subject matter. Again, the restricted subject matter can be contextual, such as seeking medical advice, so the injected prompt can disclaim that context. The injected prompt or an API field can also identify the user, group, or tenant that submitted the request. This can allow the provider to take actions against specific users, groups, or tenants that egregiously violate terms of service without punishing other users of the AI platform or rules engine that interact with the service provider.

In one example, a detection of a highly sensitive provider restriction can prevent transmission of the input to the first provider. The rules engine can cause the user device to receive an indication that the first provider does not allow the first category of restricted subject matter. The use can then submit an instruction to override the prevention of transmission of the second input to the first provide. The rules can receive the instruction and determine that the override instruction is permitted based on the evaluation of the input and the management rules. As a result, the input and the injected prompt can be submitted to the first provider. Alternatively, the indication at the user device can identify the second provider as the destination for the second input, and the user can accept that prior to transmission.

An injected prompt can cause the input to not be blocked by a second provider, whereas the first provider might be more stringent in restricting the first category of restricted subject matter.

The rules engine can include an identifier in the injected prompt or an API field in a call to the service provider. The identifier corresponds to at least one of a user, group, and tenant that submitted the input. This can allow the service provider to associate any egregious violations with the particular user, group, or tenant instead of the entire rules engine or AI platform. The service provider can take action against that identified entity, including blocking future inputs that include that identifier. Advantageously, the rules engine can continue using the provider with respect to other identifiers. In this way, no one user can cause the rules engine to be blocked from future use, which would impact a great number of users.

At stage 850, the rules engine can route the modified input based on both the management rule evaluation and the detected provider restrictions. This can include routing the modified input to a service provider that satisfies the remedial actions and also where the input is not forbidden. For example, the rules engine can route the modifier input to a second provider.

At stage 860, the rules engine can receive an output from the second provider in response to the modified input and the injected prompt. At stage 870, that output can be modified based in part on the modifications to the input. For example, the rules engine can add a message to the output related to the injected prompt, such as a disclaimer to not use the information as medical advice. The rules engine can also replace a contextual placeholder with the original portion of text from the input.

At stage 880, the rules engine can cause the output to display on the user device. This can include sending the modified output back to the gateway or AI platform that called the rules engine. The rules engine can also log any aspect of the method for auditing, such as logging the input, the first category of restricted subject matter, the routing, and the reversible transformation.

The sensitivities of the provider restrictions can be adjustable by an administrative user on a user interface (UI) of the AI platform. Detecting a category of restricted subject matter that corresponds to a provider restriction can include comparing a score for the first category against a threshold. The threshold can be adjustable on the UI is well, such as with a selection of a preset stringency for the first category.

FIG. 9 is a flowchart of example stages for dynamic pipeline object selection based on functional placeholders. The stages can be part of a method for data protection and routing when using artificial intelligence models. The method can be performed when a processor executes instructions stored in a non-transitory, computer-readable medium. Additionally, a system that includes hardware memory and a processor can execute the stages.

The method of FIG. 9 involves functional placeholders, which can be an UI element that a user drags into an AI pipeline. Specifically, the UI can provide pipeline builder functionality, allowing the user to select functional placeholders or pipeline objects for inclusion in the AI pipeline. The pipeline objects can include one or more dataset objects, model objects, prompt objects, and code objects. In one example, prior to displaying the available pipeline objects, the server can authenticate the administrator and evaluate at least one management policy that applies to the administrative user. For example, the management policy can involve network or device compliance of the administrator or can require the administrator to be inside or outside of a geofenced area. Likewise, the management policy can check groups that the administrator belongs to as part of determining which subset of pipeline objects are available to the administrator for use in pipeline creation or modification. The available subset of pipeline objects are then displayed in a menu that includes prompt objects, dataset objects, model objects, and executable code objects.

The administrator can then select and connect pipeline objects within the UI. Doing so can cause the server or another device to generate a pipeline manifest based on selected pipeline objects that are connected on the UI. The pipeline manifest can keep track of specific versions of the pipeline objects and their position coordinates on the screen.

The manifest all tracks dependencies, which include perquisite events and resources that are needed prior to executing one or more stages of the pipeline (e.g., prior to executing one or more pipeline objects). The server can cause the pipeline manifest to be validated against dependency rules for the pipeline objects. The dependency rules can vary for different pipeline objects. For example, a language model might require particular a security-related prompt package and a particular library for use as part of pre or post processing. A search of a dataset can require prior ingestion and vectorization of the dataset. Dependencies can also be used by a pipeline engine, such as waiting for dataset ingestion or waiting on vector search results prior to executing a next pipeline object.

The UI can allow the user to place functional placeholders in the AI pipeline. The functional placeholders are later replaced by actual pipeline objects based on evaluation of management rules during pipeline execution or some prior time. The functional placeholder describes the function that the user requires, whether that is a code function such as PII replacement, or a model function such as a language model query. The functional placeholders can be organized with types of pipeline objects within menus of the UI.

The functional placeholders can include function types. A function type can be assigned to a functional placeholder by an administrator. Various function type options can be available for each function type. For example, the function type can be a detector, a model, a dataset, or DLP.

The functional placeholders can also include object rules, such as one or more selection rules that help the rule engine decide which pipeline object to select and use in place of the functional placeholder. The selection rules can include an evaluation of cost rule. This can include evaluating monetary cost, execution time and latency, infrastructure consumption, infrastructure availability, energy consumption, and energy availability. The selection rules can also include a risk rule. The risk rule can include regulator compliance, security requirements, and privacy requirements. The selection rules can also be referred to as selection factors. The object rules can also include execution rules. The execution rules can relate to scheduling execution of the object to optimize the selection factors.

As an example, a developer can add a functional placeholder for a PII service to the AI pipeline. The developer does not need to pick a code pipeline object to perform the PII service. Instead, the PII pipeline object can be determined and dynamically selected at pipeline runtime to maximize the selection factors. The dynamically selected pipeline object is selected from a set of available Object Options for that Object Type based on dynamic evaluation of the Selection Rules and Scheduling Rules. Then, execution of the selected pipeline object is scheduled based on dynamic evaluation of the Scheduling Rules by the rules engine.

At stage 910, the rules engine or an AI platform can receive a request to execute an artificial intelligence (AI) pipeline. The request can originate from an application executing on a user device. The AI pipeline can be constructed to include at least one functional placeholder. The functional placeholder comprises a specification of a type of function that the AI pipeline should execute at runtime. Unlike a typical pipeline object, the functional placeholder need not itself identify the exact code or service provider involved in executing the function, but instead includes rules (object selection and execution rules) that the pipeline engine or rules engine can use to select a pipeline object. Instead, the functional placeholder identifies a function type, such as PII redaction. Although the rules engine is described as performing these stages, the pipeline engine could alternatively perform some of the stages.

At stage 920, the rules engine identifies management rules associated with the AI pipeline. The management rules include an object selection rule and an execution rule associated with the functional placeholder. In one example, the management rules can be identified by the functional placeholder.

At stage 930, the rules engine can identify a set of functionally capable objects accessible to the AI pipeline. The functionally capable objects include AI pipeline objects configured to perform the type of function specified by the functional placeholder. The set of functionally capable objects are then evaluated by the rules engine to determine which of the pipeline objects should be used.

At stage 940, the rules engine selects an object from the set based on an evaluation of the object selection rule and the execution rule associated with the functional placeholder. For example, an object selection rule can be a selection cost rule, which includes rules around monetary cost and/or execution performance impact. An execution performance impact rule can compute performance cost rule, a memory performance cost rule, and/or a network performance cost rule. The selection cost rule can include infrastructure impact rules.

The object selection rules can also include a risk rule or a compliance rule. The selection risk rule can include a trade compliance risk rule, a cyber security risk rule, and a sensitive data risk rule. These risk rules can be used to ensure that a selected pipeline object accounts for the risk prevention a tenant has in mind for the AI pipeline.

The object placeholder can also include one or more object compliance rules. The object compliance rules can be used to ensure the selected pipeline object meets terms of service for the AI platform or other pipeline objects in the AI pipeline. The object compliance rules can also be set to ensure rules of the AI pipeline, such as DLP rules, are enforced by whichever pipeline object is selected to fill the object placeholder.

These object selection and compliance rules can include maximum or minimum thresholds and can be compared to technical information of the pipeline objects in the set. A pipeline object that best meets the various object selection and execution rules can be selected by the rules engine.

In one example, the UI can allow an administrator to supply weights on the object selection and execution rules. Therefore, similarly to generating a remediation score, the rules engine can generate a selection score for each the pipeline objects in the set. The pipeline object with the best (e.g., highest) selection score can be selected to operate in place of the functional placeholder.

At stage 950, the rules engine can cause the selected object to be executed in accordance with the at least one execution rule. The selected object is executed in place of the functional placeholder during the execution of the AI pipeline. The execution rules can guide how and when the selected object executes. One example execution rule is an execution scheduling rule. This rule can cause the selected object to execute at a particular day and time. The execution scheduling rule can alternatively prohibit a period or day. This is because resource availability and cost can shift throughout the course of the day, meaning the execution timing can be associated with different costs. Additionally, for an AI pipeline that must execute quickly, the execution rule can help ensure that the selected object does not cause unacceptable delay. Another type of execution rule is a deployment rule, which can specify where a selected object can or cannot be executed. The execution deployment rule can include an indication of at least one geographic location where execution of the functional placeholder is permitted.

The AI platform can also include a marketplace where third parties can monetize and optionally deploy their pipeline objects (e.g., AI models, datasets, python scripts, identity provider hooks, detectors, prompt packages, etc.). The function type of the functional placeholder can align with the categories of pipeline objects at the marketplace. The marketplace objects can be purchased on a "per use" basis, in an example. This can allow the rules engine to compare the cost and execution requirements of the functional placeholder against the marketplace pipeline objects and select objects from the marketplace that meet the functional placeholder requirements.

Figure 10:
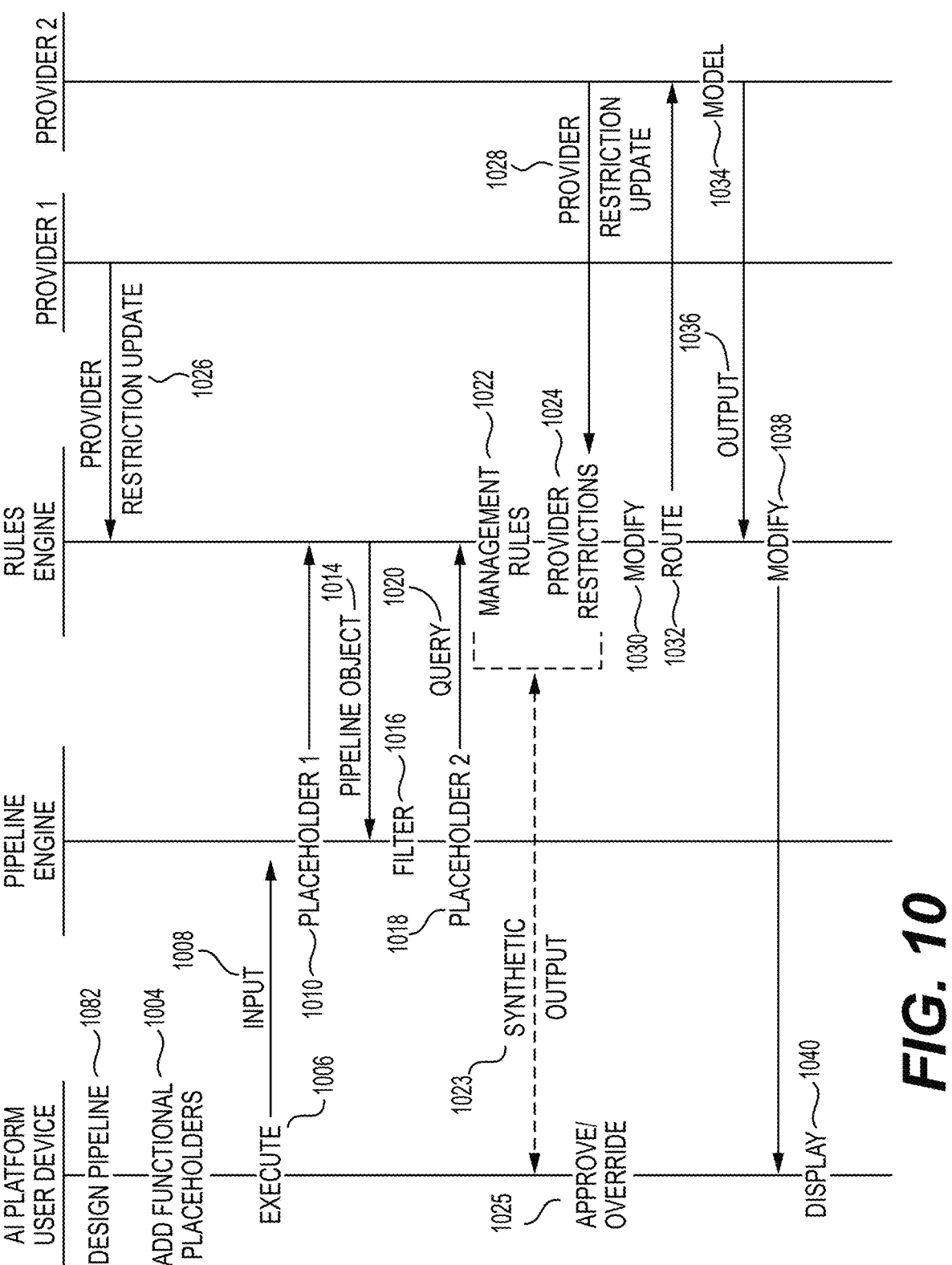
FIG. 10 is a sequence diagram with example stages for dynamic routing of an AI pipeline based on pipeline object selection for functional placeholders, management rule evaluation, and provider restriction detection.

FIG. 10 is a sequence diagram with example stages for dynamic routing of an AI pipeline based on pipeline object selection for functional placeholders, management rule evaluation, and provider restriction detection. At stage 1002, a user can access an AI platform. The AI pipeline platform can execute on a server. A user can access the platform with a user device, either through an application that executes locally on the user device or through a web application. The platform can present a UI with pipeline objects and tools for constructing an AI pipeline, which can display as a flow diagram on the UI. The UI also allows or the creation and use of functional placeholders, which the user can place in an AI pipeline.

At stage 1004, the user can insert a functional placeholder into an AI pipeline. This can include dragging a functional placeholder onto the screen and connecting it to other functional placeholders or pipeline objects. Doing so can cause the server or another device to generate a pipeline manifest. The pipeline manifest can be based on selected functional placeholders and pipeline objects that are connected on the UI. The pipeline manifest can keep track of specific versions of the pipeline objects and their position coordinates on the screen. The manifest all tracks dependencies, which include perquisite events and resources that are needed prior to executing one or more stages of the pipeline (e.g., prior to executing one or more pipeline objects). The user can also define object selection and execution rules, among other management rules, for the functional placeholder. These defined object rules can be described in the manifest.

The AI pipeline can be deployed the user selecting an option. The AI platform can cause a version identifier of the pipeline to indicate that the pipeline is active. The deployed AI pipeline is then accessible by at least one AI application through a generated endpoint.

At stage 1006, the user can cause the AI pipeline to execute. This can include submitting an input within the application that makes a call to the endpoint. The AI application can submit an input and application context to the endpoint at stage 1008. A pipeline engine can handle the input and begin executing the AI pipeline. The deployed pipeline can be executed in stages dictated by the pipeline manifest.

At stage 1010, the pipeline engine encounters a functional placeholder in the pipeline manifest, in this example indicated as "placeholder 1." The pipeline engine can send the functional placeholder (the function type and various object rules) to the rules engine. The rules engine, at stage 1012, can then select the pipeline object having a same function type and that best meets the object rules of the functional placeholder. To do this, the rules engine can start with a set of pipeline objects having the compatible function type. These pipeline objects can exist either on the AI platform or in a marketplace accessible by the AI platform. The pipeline objects can have technical specifications that the rules engine can correlate to the various object rules. The rules engine can pick the pipeline object having the least rule violations and, ideally, the pipeline object that meets the more heavily weighted object rules by the widest margin. This could be, for example, the pipeline object of the same functional type that performs the best for the lowest monetary cost, while also being compliant and meeting terms of service of other pipeline objects in the manifest.

At stage 1014, the rules engine identifies the pipeline object to the pipeline engine for execution. In this example, the selected pipeline object was a filtering detector, such as a PII replacement tool, either executes at stage 1016 or is used later by the rules engine. This modifies the input to remove, for example, PII such as names and sensitive personal data. At stage 1018, the rules engine or pipeline engine replaces the PII with contextual placeholders, resulting in a modified input.

Next, at stage 1080, the pipeline engine encounters a second functional placeholder in the manifest. This functional placeholder ("placeholder 2") is a language model function type. Therefore, the pipeline engine sends both the input and the functional placeholder information to the rules engine at stage 1020. The input includes a query destined for a default language model.

At stage 1022, the rules engine selects a set of service providers that meet the object rules of the second placeholder. That set of service providers is further subjected to an evaluation of management rules at stage 1022, such as in stage 720 of FIG. 7, and provider restriction detection at stage 1024, such as in stage 710 of FIG. 7. This can further reduce the number of service providers and models available in the set. Additionally, at stage 1030, the input can be modified based on the management rules and based on the PII filter selected at stage 1012, such as replacing the PII with contextual placeholders.

Additionally, when particular management rules are implicated or provider restrictions are detected, the rules engine can block transmission of the input and issue a synthetic output back to the AI platform or user device at stage 1023. This can include the format of the default model output so to not crash any applications. And the synthetic output can notify the user of the issue and allow the user to approve an alternative input or model, or override the restriction at stage 1025. These user selections can be sent back to the rules engine, which can use the selections in modifying and routing the input at stages 1030 and 1032. The user selections can also be logged.

At stage 1030, the modified input can be routed to whichever remaining model and service provider exceeds the requirements of the object rules, management rules, and provider restrictions the most. To make that determination, the various remediation scores, object rule scores, and provider restriction scores can be weighted and summed according to administrative settings for the tenant, group, or user. Again, these weights can be set on the UI, in an example. The best (e.g., highest) scoring provider and model can receive the modified input and any injected prompts. At stage 1034, the model can evaluate the modified input and return an output at stage 1036.

The rules engine can apply post-processing and management rules to the output at stage 1038, modifying the output. This can include replacing the contextual placeholders with the original text. The modified output can be sent back to the pipeline engine and ultimately the user device, where it is displayed onscreen at stage 1040.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for data protection and routing when using artificial intelligence models, comprising:
   receiving a first input at a gateway, from an application executing on a user device, the application being configured to utilize a default model;
   identifying management rules associated with an application context;
   based on evaluation of the first input and the management rules, preventing the first input from being transmitted to the default model;
   causing a first output to be displayed on the user device in response to the first input, wherein the first output comprises a synthetic output compatible with the application's configuration to utilize the default model;
   receiving a second input from the application executing on the user device;
   based on evaluation of the second input and the management rules, at least:
      modifying the second input by replacing a portion of the second input with a contextual placeholder; and
      routing the modified second input to an alternate model, wherein the alternate model is different than the default model;
   receiving a second output from the alternate model;
   modifying the second output by replacing the contextual placeholder with the portion of the second input; and
   causing the modified second output to be displayed on the user device.

2. The method of claim 1, further comprising causing logging of the first input and information associated with the evaluation of the first input and the management rules.

3. The method of claim 1, wherein the synthetic output further comprises an indication that the evaluation of the first input and the management rules prevented transmission of the first input to the default model.

4. The method of claim 1, further comprising:
   receiving an instruction to override the prevention of transmission of the first input to the default model;
   determining that the override instruction is permitted based on the evaluation of the first input and the management rules; and
   transmitting the first input to the default model.

5. The method of claim 1, wherein management rules are identified based on a tenant associated with the application context, wherein at least some of the management rules include weights that are applied through a user interface (UI) by an administrative user, and wherein the weights are used to calculate remediation scores for evaluating the first and second inputs, wherein the remediation score for the second input is above a threshold for allowing the input and below a threshold for blocking the input.

6. The method of claim 1, wherein the routing of the modified input includes translating the modified input to meet an application programming interface (API) format for the alternate model, wherein the API format for the alternate model differs from an API format for the default model.

7. The method of claim 1, further comprising using the management rules to:

generate a remediation score for the second input, wherein the remediation score is compared against thresholds for determining a first remedial action to take with respect to modifying the second input.

8. A non-transitory, computer-readable medium containing instructions that, when executed by a hardware-based processor, causes the processor to perform stages for data protection and routing when using artificial intelligence (AI) models, comprising:

receiving a first input at an AI platform server, from an application executing on a user device, the application being configured to utilize a default model;

identifying management rules associated with an application context;

based on evaluation of the first input and the management rules, preventing the first input from being transmitted to the default model;

causing a first output to be displayed on the user device in response to the first input, wherein the first output comprises a synthetic output compatible with the application's configuration to utilize the default model;

receiving a second input from the application executing on the user device;

based on evaluation of the second input and the management rules, at least:

modifying the second input by replacing a portion of the second input with a contextual placeholder; and routing the modified second input to an alternate model, wherein the alternate model is different than the default model;

receiving a second output from the alternate model;

modifying the second output by replacing the contextual placeholder with the portion of the second input; and causing the modified second output to be displayed on the user device.

9. The non-transitory, computer-readable medium of claim 8, the stages further comprising causing logging of the first input and information associated with the evaluation of the first input and the management rules.

10. The non-transitory, computer-readable medium of claim 8, wherein the synthetic output further comprises an indication that the evaluation of the first input and the management rules prevented transmission of the first input to the default model.

11. The non-transitory, computer-readable medium of claim 8, the stages further comprising:

receiving an instruction to override the prevention of transmission of the first input to the default model;

determining that the override instruction is permitted based on the evaluation of the first input and the management rules; and transmitting the first input to the default model.

12. The non-transitory, computer-readable medium of claim 8, wherein management rules are identified based on a tenant associated with the application context, wherein at least some of the management rules include weights that are applied through a user interface (UI) by an administrative user, and wherein the weights are used to calculate remediation scores for evaluating the first and second inputs, wherein the remediation score for the second input is above a threshold for allowing the input and below a threshold for blocking the input.

13. The non-transitory, computer-readable medium of claim 8, wherein the routing of the modified input includes translating the modified input to meet an application programming interface (API) format for the alternate model, wherein the API format for the alternate model differs from an API format for the default model.

14. The non-transitory, computer-readable medium of claim 8, the stages further comprising using the management rules to:

generate a remediation score for the second input, wherein the remediation score is compared against thresholds for determining a first remedial action to take with respect to modifying the second input.

15. A system for data protection and routing when using artificial intelligence models, comprising:

a memory storage including a non-transitory, computer-readable medium comprising instructions; and at least one hardware-based processor that executes the instructions to carry out stages comprising:

receiving a first input, from an application executing on a user device, the application being configured to utilize a default model;

identifying management rules associated with an application context;

based on evaluation of the first input and the management rules, preventing the first input from being transmitted to the default model;

causing a first output to be displayed on the user device in response to the first input, wherein the first output comprises a synthetic output compatible with the application's configuration to utilize the default model;

receiving a second input from the application executing on the user device;

based on evaluation of the second input and the management rules, at least:

modifying the second input by replacing a portion of the second input with a contextual placeholder; and routing the modified second input to an alternate model, wherein the alternate model is different than the default model;

receiving a second output from the alternate model;

modifying the second output by replacing the contextual placeholder with the portion of the second input; and causing the modified second output to be displayed on the user device.

16. The system of claim 15, the stages further comprising causing logging of the first input and information associated with the evaluation of the first input and the management rules.

17. The system of claim 15, wherein the synthetic output further comprises an indication that the evaluation of the first input and the management rules prevented transmission of the first input to the default model.

18. The system of claim 15, the stages further comprising:

receiving an instruction to override the prevention of transmission of the first input to the default model;

determining that the override instruction is permitted based on the evaluation of the first input and the management rules; and transmitting the first input to the default model.

19. The system of claim 15, wherein management rules are identified based on a tenant associated with the application context, wherein at least some of the management rules include weights that are applied through a user interface (UI) by an administrative user, and wherein the weights are used to calculate remediation scores for evaluating the first and second inputs, wherein the remediation score for the second input is above a threshold for allowing the input and below a threshold for blocking the input.

20. The system of claim 15, wherein the routing of the modified input includes translating the modified input to meet an application programming interface (API) format for the alternate model, wherein the API format for the alternate model differs from an API format for the default model.

\* \* \* \* \*